United States Patent [19]

Struger et al.

[11] Patent Number: 4,882,702

[45] Date of Patent: Nov. 21, 1989

[54] PROGRAMMABLE CONTROLLER WITH I/O EXPANSION MODULE LOCATED IN ONE OF I/O MODULE POSITIONS FOR COMMUNICATION WITH OUTSIDE I/O MODULES

[75] Inventors: Odo J. Struger, Chagrin Falls; Mark Luboski, Euclid; Timothy J. Murphy, Hudson, all of Ohio

[73] Assignee: Allen-Bradley Company, Inc., Milwaukee, Wis.

[21] Appl. No.: 195,407

[22] Filed: May 16, 1988

Related U.S. Application Data

[63] Continuation of Ser. No. 845,965, Mar. 31, 1986, abandoned.

[51] Int. Cl.$^4$ ............... G06F 13/38; G06F 13/28; G06F 13/10
[52] U.S. Cl. ............... 364/900; 364/132; 364/137; 364/926.9; 364/926.93; 364/948.1; 364/940.68; 364/940.81
[58] Field of Search ........... 364/132, 137, 138, 474.11, 364/200 MS File, 900 MS File; 340/825.02, 825.03

[56] References Cited

U.S. PATENT DOCUMENTS

| | | | |
|---|---|---|---|
| 3,806,877 | 4/1974 | Kiffmeyer et al. | 364/900 |
| 4,121,285 | 10/1978 | Chen | 364/200 |
| 4,153,945 | 5/1979 | Actor et al. | 364/900 |
| 4,293,924 | 10/1981 | Struger et al. | 364/900 |
| 4,319,338 | 3/1982 | Grudowski et al. | 364/900 |
| 4,326,289 | 4/1982 | Dickinson | 370/85 |
| 4,413,319 | 11/1983 | Schultz et al. | 364/200 |
| 4,442,504 | 4/1984 | Dummermuth et al. | 364/900 |
| 4,477,882 | 10/1984 | Schumacher et al. | 364/900 |
| 4,504,927 | 3/1985 | Callan | 364/900 |
| 4,654,821 | 3/1987 | Lapp | 364/900 |
| 4,683,530 | 7/1987 | Quatse | 364/200 |
| 4,691,296 | 9/1987 | Struger | 364/900 |
| 4,742,477 | 5/1988 | Phillips et al. | 364/708 |

FOREIGN PATENT DOCUMENTS 58-82304  5/1983  Japan .
58-101357 6/1983  Japan .
59-223828 12/1984 Japan .
59-229662 12/1984 Japan .

OTHER PUBLICATIONS

Baker, Stan, "RS-485 Interface Standard Gains Acceptance," *Electronic Engineering Times*, (Feb. 27, 1984), pp. 47 and 50.
Product Summary, Automate 30–Automatic 40, Reliance Electric Company, Mar. 21, 1985, pp. 14–15.
McWilliams, Peter D. et al, "Microcontroller Serial Bus Yields Distributed Multispeed Control", *Electronics*, pp. 125–130, (Feb. 9, 1984).
Doherty, Richard, "Intel Develops New Silicon Serial Bus," *Computer Engineering*, (Feb. 23, 1984), pp. 67 and 70.

*Primary Examiner*—Archie E. Williams, Jr.
*Assistant Examiner*—Thomas Lee
*Attorney, Agent, or Firm*—Quarles & Brady

[57] ABSTRACT

The capacity of programmable controllers with a processor module and I/O modules connected in a single equipment rack is expanded by connecting an I/O expansion module in one of the positions normally occupied by a conventional I/O module. The I/O expansion module communicates with the processor module through the rack backplane and also communicates with other racks of I/O modules and with node I/O modules through a serial data channel. Data for I/O modules on the serial data channel are stored in a bulk storage area in the processor module to expand the effective size of an image table of I/O status data that is maintained by the processor module. The processor module is programmed to operate with a backplane controller in the I/O expansion module to transfer data in or out of the bulk storage area. Besides the backplane controller, the I/O expansion module includes a serial channel controller, a common memory and arbitration circuity which allows the controllers to alternate access to the common memory and to exchange data. The serial channel controller controls multiplexing and demultiplexing of I/O status data with the I/O modules through the serial data channel.

10 Claims, 11 Drawing Sheets

Microfiche Appendix Included
(2 Microfiche, 2 Pages)

PROGRAMMABLE CONTROLLER WITH I/O EXPANSION MODULE LOCATED IN ONE OF I/O MODULE POSITIONS FOR COMMUNICATION WITH OUTSIDE I/O MODULES

This application is a continuation of application Ser. No. 845,965, filed Mar. 31, 1986, now abandoned.

Microfiche Appendix B with 2 microfiche containing a total of 68 frames, and Appendix C with 2 microfiche containing a total of 91 frames, are incorporated herein.

BACKGROUND OF THE INVENTION

1. Field of the Invention

The invention relates generally to digital controllers for controlling industrial machines and processes and more particularly to programmable controllers.

2. Description of the Background Art

A small programmable controller (PC) includes a processor module and several I/O modules which are supported in the same equipment rack. The processor module transmits data to the I/O modules and receives data from the I/O modules through a backplane circuit board. The backplane circuit board, or simply "backplane," as it is often referred to, is a circuit board with numerous printed circuit paths or traces extending horizontally across the back of the rack to interconnect the modules in the rack.

When a PC processor has been included in the same rack as the I/O modules, the number of I/O modules and the I/O capacity associated with the in-rack processor have been limited by the size of the I/O rack and the backplane. The I/O capacity can be thought of as the number of single-bit I/O devices that can be connected to the I/O modules.

With the addition of "high density" I/O modules, such as shown and described in Struger et al., U.S. Pat. No. 4,293,924, issued Oct. 8, 1981, the number of bits of data that could be communicated to I/O devices through a single I/O module increased from eight bits (one byte) up to sixty-four bytes. When using a small in-rack processor, these high density I/O modules have resided in the same I/O rack as the processor module and the low-density I/O modules.

A larger programmable controller disclosed in Schultz et al., U.S. Pat. No. 4,413,319, includes a stand-alone main processor and a number of "remote" I/O racks strung out along serial communication channels. For purposes of communicating with the individual racks, a scanner module interfaces the main processor to the serial communication channels. The scanner module in the Schultz et al. patent is capable of sending blocks of I/O status data to high density I/O modules residing in the remote I/O racks.

The ability to expand the control capability of small in-rack processors has been limited to the size of the largest available I/O rack. The scanner module of the Schultz et al. system cannot be inserted in an equipment rack and connected to a rack backplane for communications. It has not, therefore, been usable in the same rack with a small in-rack processor of the type described above.

Users of controller equipment are demanding more I/O capacity per processor, smaller size and greater ability to control equipment in widely distributed locations. The present invention is a further important step in satisfying these needs.

SUMMARY OF THE INVENTION

The invention relates to a method and apparatus for providing a hierarchical I/O system in which the I/O capacity of a small in-rack controller processor is expanded and distributed without extending the backplane of the rack that holds the processor.

The apparatus of the invention is an I/O expansion module which can be placed in any I/O slot in the rack holding the processor. The I/O expansion module has a backplane controller that communicates with the processor by transferring a large block of I/O status data through the rack backplane. The apparatus also has a serial I/O port and a serial channel controller for communicating I/O status data to I/O modules outside its own I/O rack. A read/write memory and arbitration circuitry allow transfer of I/O status data between the backplane controller and the serial channel controller.

With the invention a large block of data can be transferred to or from the I/O expansion module as part of the I/O scan of a first tier of I/O modules in a primary rack with the processor. The I/O expansion module then transmits and receives data in a secondary I/O scan of a second tier of I/O modules. The data would then be transferred a third time—to or from the I/O devices on a controlled machine or process.

With the invention I/O modules can be added without expanding the existing memory in small in-rack processor modules. An I/O image table in these modules is sized to store I/O status data for only a single rack of I/O modules. However, the invention allows another storage area, normally assigned to store data for "high density" I/O modules, to be used as an extension of the I/O image table to handle the I/O status data for an expansion group or second tier of I/O modules.

The invention allows more I/O status data to be communicated to and from I/O image tables in the memory in the controller processor and thus the capacity of the controller system is increased.

The invention also allows expansion of the I/O capacity of a small in-rack processor module to include I/O node modules that are not disposed in any I/O rack. This I/O expansion increases the I/O capacity of the main processor without any increase in rack hardware.

A remote I/O system can be created for a small processor previously limited to controlling its own rack of I/O modules. The controller processor still executes its I/O scanning sequence in the manner it would for a single-rack system.

In the method of the invention, I/O status data for a second tier of I/O modules is transferred in a large block to or from the I/O expansion module, which may be placed in any I/O slot in the primary rack. The large block of I/O status data is transferred to or from the I/O slot using an address that corresponds to a single address in an image table maintained by the processor. In the PC processor, the image table address is linked to a larger storage area in memory. In the I/O expansion module, the block of data is stored in a second image table which corresponds to the larger storage area in the PC processor. According to its location in the second image table, the I/O status data is communicated to and from a second tier of I/O modules distributed along a serial data link. These modules may be connected in secondary racks or they may reside outside of any rack.

The invention provides an economy in hardware because the link to additional I/O modules is a serial communication channel, which is lower in cost than additional rack hardware. Also, serial communication channels offer improved resistance to spurious electrical signals—a basic technical problem in the industrial environment—because such serial communication channels can be shielded from such spurious signals using coaxial cable, twisted pairs and other noise immunity techniques.

To summarize, one object of the invention is to increase I/O capacity. Another object of the invention is to further distribute the I/O modules that can be controlled by small in-rack processor modules. And a third object of the invention is to reduce the hardware required to control I/O devices in a controlled system.

These and other objects and advantages of the invention will be apparent from the following description, in which reference is made to the accompanying drawings, which form a part hereof, and in which there is shown by way of example a preferred embodiment of the invention. This example does not necessarily represent the full scope of the invention, however, and reference is therefore made to the claims for determining the various embodiments within the scope of the invention.

DETAILED DESCRIPTION OF THE PREFERRED EMBODIMENT

A. Programmable Controller System Architecture

Figure 1:
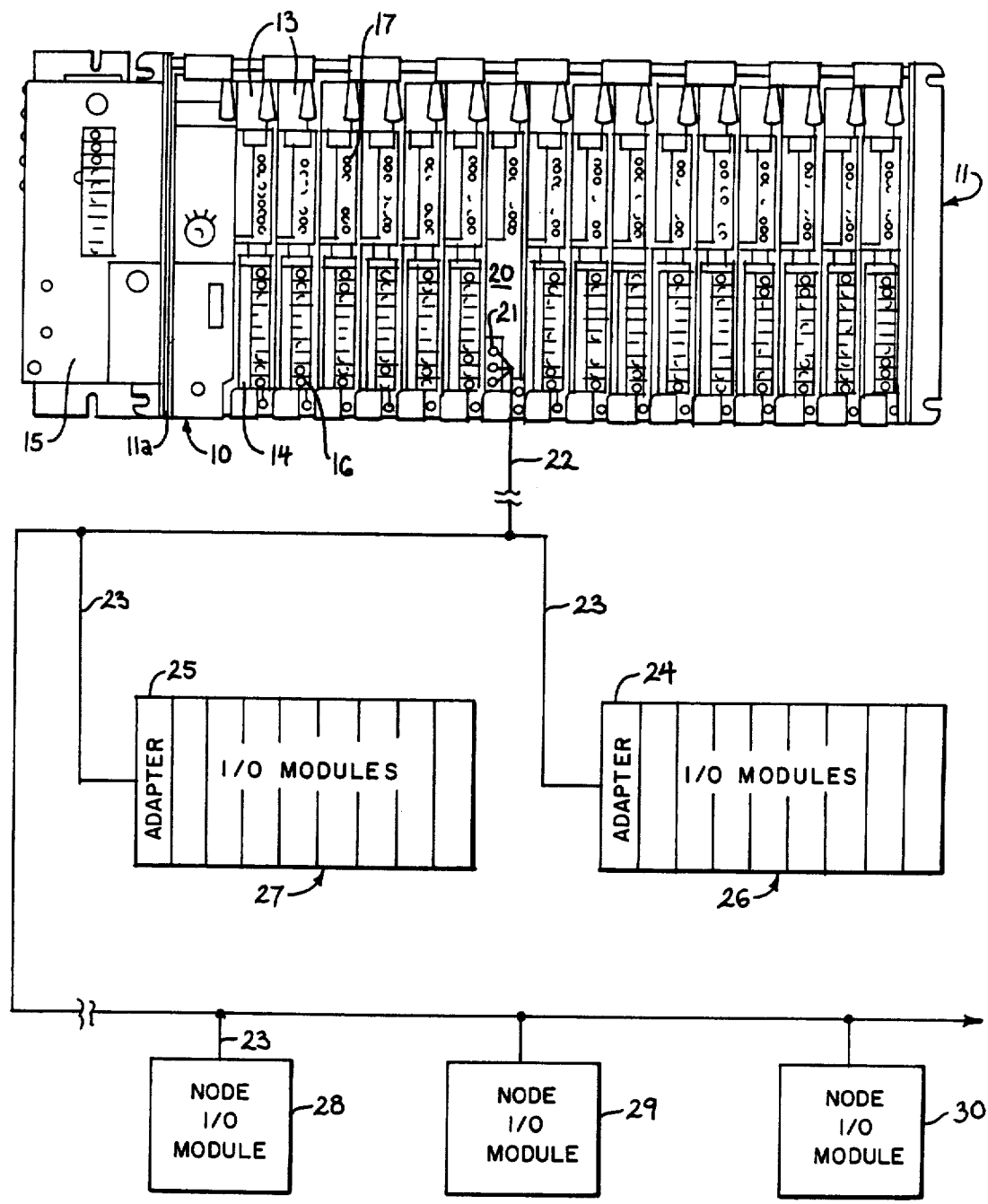
FIG. 1 is a front elevational view of a programmable controller using the I/O expansion module of the invention with certain schematic details.

FIG. 1 shows a programmable controller system which utilizes the method and apparatus of the invention. The components of the controller are supported by an equipment rack 11. A power supply 15 is attached to a left sidewall 11a of the rack 11. Next to the power supply is a small-capacity, in-rack controller processor unit 10. This module 10 is the "brain" of the system, and shall therefore also be referred to as the "PC processor", which means "programmable controller processor". The PC processor 10 is inserted in the leftmost slot of an equipment rack 11 and is connected through a backplane (not shown) of the rack 11 to a group of I/O modules 13 residing in other slots of the rack 11. The power supply 15 is electrically connected to the backplane through a cord, plug and socket which are not seen in FIG. 1.

Each physical slot in the rack 11 is defined by guide rails (not shown) for holding the top and bottom of a circuit module and by connectors mounted on the backplane. The modules 10, 13 have their own back edge connectors which plug into the connectors on the backplane. In addition, the I/O modules 13 plug into swing-arm connectors 14 on the front of the rack 11. These connectors 14 include vertical rows of screw-type terminals 16 for wiring connections to I/O devices on a controlled machine or process. The vertical rows of LED's 17 seen in FIG. 1 are part of the I/O modules 11.

The I/O modules 13 may be input modules or output modules. The input modules convert AC and DC signals from input devices, such as sensors, limit switches and push buttons, to digital logic-level signals that can be stored as input data. The output modules convert digital logic-level signals to AC and DC signals for operating output devices such as relays and motor contactor switches. The I/O modules 13 connect to these input and output devices through the screw-type terminals 16 on the swing-arm connectors 14.

The backplane 12 (represented schematically in FIG. 2) includes a large number of circuit paths or "traces" extending horizontally to interconnect the processor module 10 to each of the I/O modules 13 in its respective rack 11. A group of these circuit paths form a byte-wide parallel data bus for carrying bytes of I/O status data back and forth between the processor module 10 and the I/O modules 13.

The invention concerns a method and apparatus for expanding the capacity of controller system using a small processor 10 of the type shown in FIG. 1. The apparatus is embodied in an I/O expansion module 20 which is inserted into one of the slots available for I/O modules 13 in the primary equipment rack 11 in FIG. 1. The I/O expansion module 20 has a serial I/O port connector 21 in the form of several terminals on its lower front portion These are connected by serial communication cabling 22 and drop lines 23 to adapter modules 24, 25 in a pair of expansion racks 26, 27 of second tier I/O modules 13. For a description of the circuitry and operation of the adapter modules 24, 25 reference is made to Schultz et al., U.S. Pat. No. 4,413,319. The I/O expansion module 20 is also connected by the serial communication cabling 22 and drop lines 23 to node I/O modules 28-30 which are located outside of any equipment rack.

The general functions of the PC processor module 10 and the I/O modules 13 are well known to those skilled in the art. The PC processor module 10 executes a control program, and at the end of one cycle through the control program, executes an input/output routine sometimes referred to as an "I/O scan". The control program, sometimes referred to as a user's application program, because the program is developed in a user program language for one of many possible industrial applications.

In executing the program, the PC processor module 10 generates output status data in response to the state of input status data and according to the logic contained in the user control program. At some predetermined time, in this instance between cycles of control program execution, the PC processor module 10 executes the I/O scan to read input status data from those of the I/O modules 13 that are input modules, and to write output status data to those of the I/O modules 13 that are output modules. For further information on the programmable controller system seen in FIG. 1, reference is made to Struger, U.S. Pat. No. 4,250,563, issued Feb. 10, 1981, and Struger et al., U.S. Pat. No. 4,293,924, issued Oct. 6, 1981.

B. I/O Scan of the First Tier of I/O Modules

Figure 2:
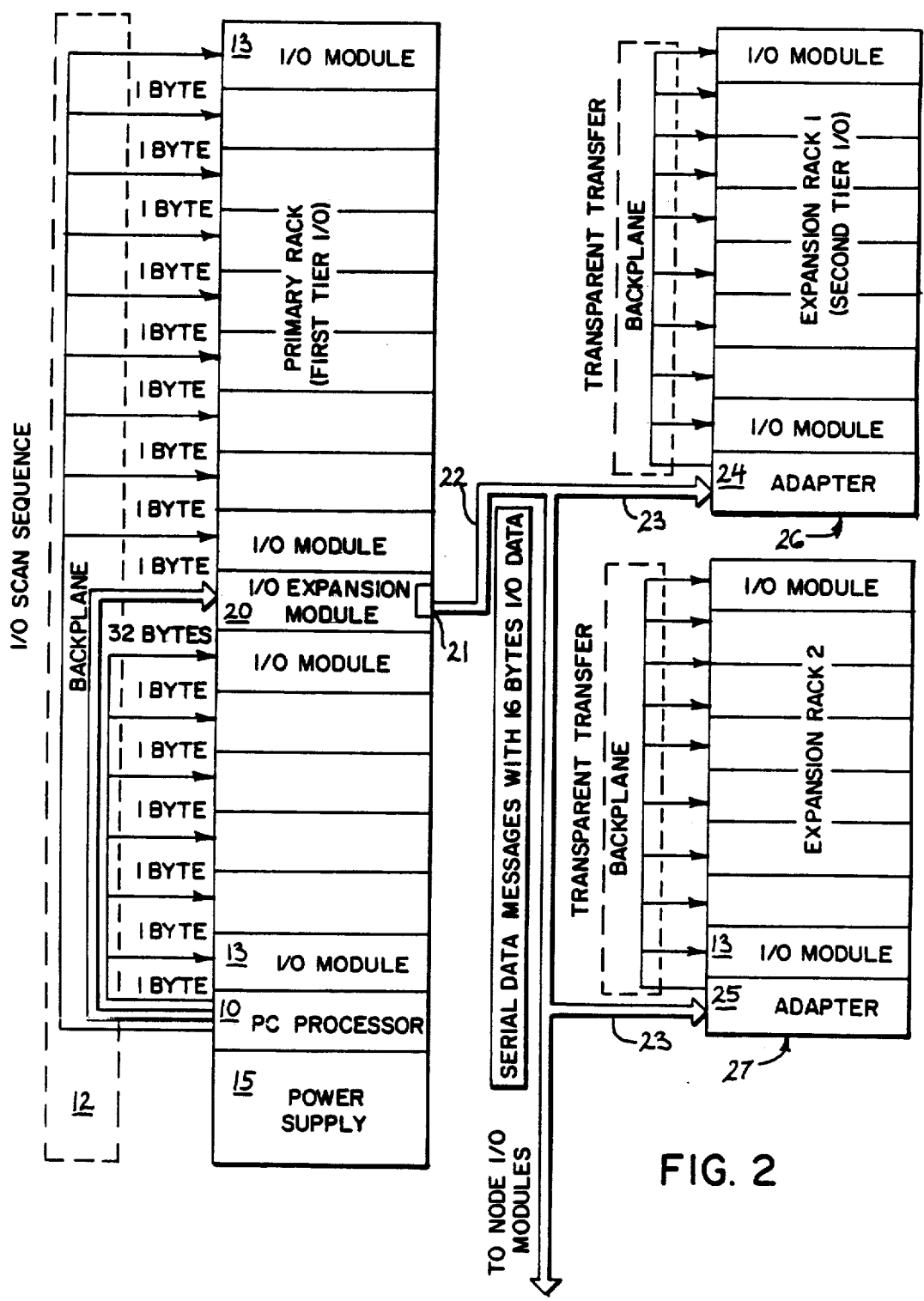
FIG. 2 is a schematic illustrating the hierarchical I/O system present in the programmable controller of FIG. 1.

FIG. 2 shows how the I/O modules 13 are enabled in sequence during an I/O scanning operation. The backplane connectors and lines on the backplane 12 allow bytes of I/O status data to be transmitted from the PC processor module 10 to the I/O modules 13. The address of the first I/O module 13 is decoded by a decoder in the PC processor module 10 to activate a corresponding slot enable line. A byte of I/O status data is then transferred from the PC processor module 10 to the first I/O module 13. It should be understood that some or all of these could be input modules. In that case, the direction of transfer of I/O status data would be from the I/O modules 13 to the PC processor module 10.

The arrows in FIG. 2 show that the transfers occur generally in a sequence beginning with the leftmost slot containing an I/O module 13 and continuing to the rightmost slot containing an I/O module 13. During this sequence, a first pair of I/O modules 13 is enabled to receive output status data, and then to send input status data, before proceeding to the next pair of I/O modules. This sequence allows either an input module or an output module to be placed in any slot in the equipment rack 11 except the slot for the processor module 10.

When the I/O expansion module 20 is enabled during the I/O scanning sequence, a group of at least thirty-two bytes is transferred to provide enough I/O status data for the two expansion racks 26, 27. This assumes a sixteen-byte header and eight bytes of I/O status data for each expansion rack 26, 27. The expansion racks 26, 27 could be larger, and could then hold up to sixteen I/O modules each sending or receiving a byte of I/O status data, so that sixteen bytes of I/O status data could be transferred for each rack. Then forty-eight bytes of I/O status data would be transferred from the PC processor module 10 to the I/O expansion module 20 or vice versa. If data is to be transferred for the node I/O modules 28–30, then even more bytes of I/O status data would be transferred. The maximum data transfer capability of the I/O expansion module 20 is 128 bytes of data. The method of transferring this data is referred to generally as "block transfer", and is disclosed in Struger et al., U.S. Pat. No. 4,293,924, issued Oct. 6, 1981.

Figure 3:
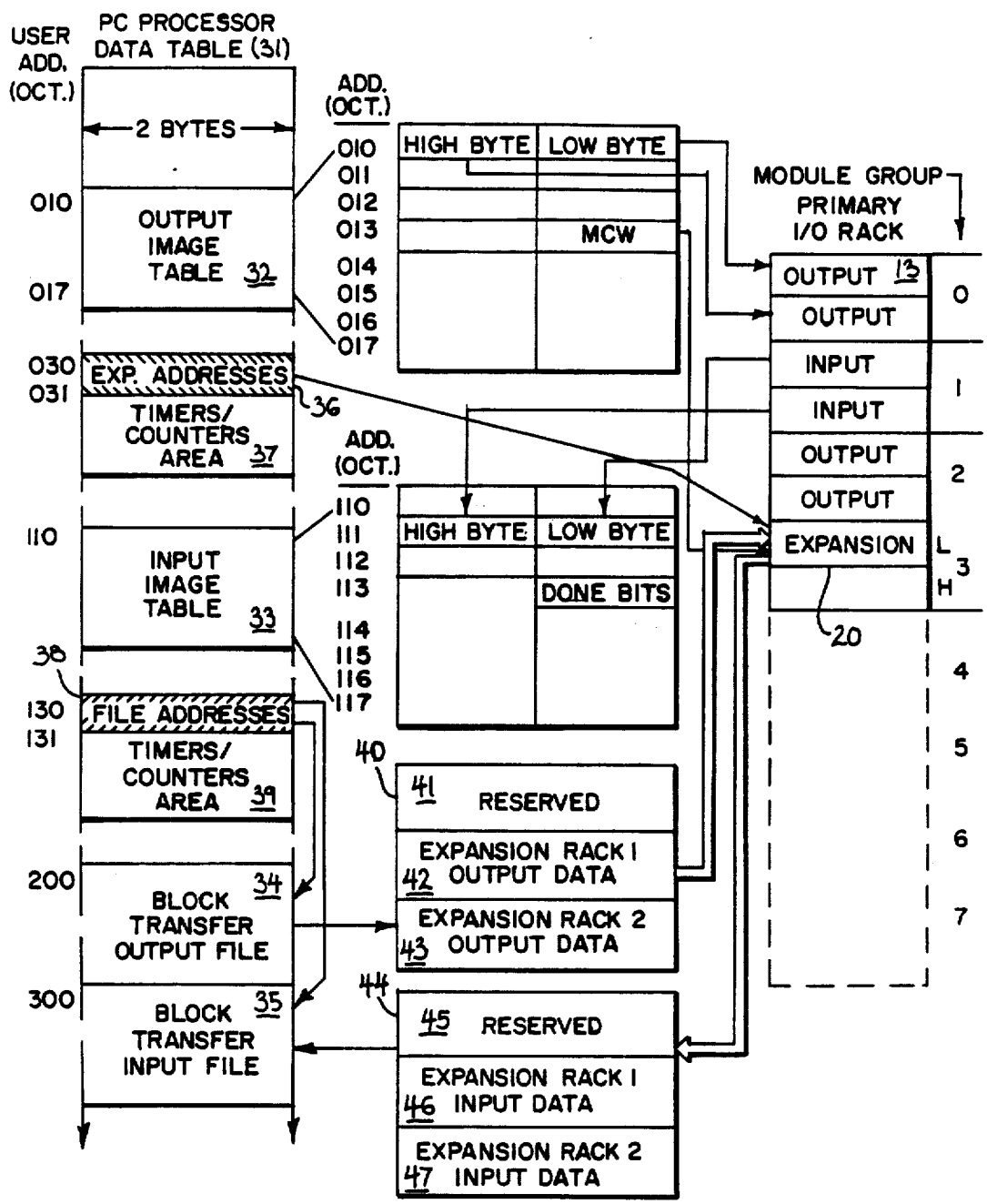
FIG. 3 is a map showing the transfer of I/O status data between areas in memory and the I/O modules in the programmable controller of FIG. 1.

FIG. 3 shows the I/O scanning sequence as it relates to the storage of I/O status data in a main memory in the PC processor module 10. The I/O status data is transferred between a data table 31 and the I/O modules 13. The data table 31 includes an image table, which is divided into an output image table 32 for output status data and an input image table 33 for input status data.

The addresses in the output image table 32 are related to the physical locations of the output modules. Octal address 010 is interpreted as follows: the first "0" means "output", the "1" means "rack 1" and the second "0" means "module group 0". Each module group consists of two I/O modules in two adjacent I/O slot positions. Each image table location stores two bytes of I/O status data, a low byte and a high byte, which are associated with the two I/O modules in the module group Each full rack includes eight module groups numbered from 0–7 (octal). If, for example, two output modules are located in Module Group 0 of Rack 1, then a low byte will be transmitted to the first one and a high byte will be transmitted to the second one during the I/O scan operation.

If two input modules are located in Module Group 1 of Rack 1, two bytes of input status data will be received and stored in corresponding locations in the input image table 33. These locations have address "111", where the first "1" means "input", the second "1" means "rack 1" and the third "1" means "module group 1". A place is reserved in both the output image table 32 and the input image table 33 for each physical I/O location so that either an input module or an output module can be placed in any location in the I/O rack 13.

The output image table 32 and input image table 33 in FIG. 3 are sized to accommodate I/O status data for only one rack because up until the time of the invention, the PC processor module 10 could only communicate with I/O modules 13 in its own rack.

When the I/O expansion module 20 is placed in one of the rack slots in place of a conventional I/O module 13, the I/O scanning operation is modified to execute a block transfer at the I/O slot location holding a module capable of this type of transfer. During this operation, up to 128 bytes of I/O status data may be moved between one of the block transfer file areas 34, 35 in the main memory and a data table in the I/O expansion module 20. From there, the I/O status data may be sent to I/O modules outside the first rack 13 over a serial data channel embodied in the cabling 22 and drop lines 23 discussed earlier.

FIG. 3 illustrates a "block transfer" to the I/O expansion module 20 in the low byte position in Module Group 3 in Rack 1. The block transfer is controlled by a sequence of microprocessor instructions in the PC processor module 10 and by parameters which are supplied by the user in the user-language application program. A module control word (MCW) is stored in an output image table location, so that it will be transmitted to the I/O expansion module 20. This word is actually a "byte" with read and write flag bits as the high order bits "7" and "6", followed by a "block length" number of six bits. This number indicates how many words (pairs of bytes) of I/O status data will be transmitted as a block to the single I/O address occupied by the I/O expansion module 20.

One parameter provided by the user for execution by the block transfer programming is the expansion address 36 of the I/O expansion module 20. This address is preferably stored in the first location (030 octal) in a timers and counters area 37, which is then searched by the block transfer instruction sequence to find the I/O address. If the I/O expansion module 20 is bidirectional, one address is stored for input and one address is stored for output in two successive locations (030 and 031 octal). The address word format includes "read" and "write" direction flags and three binary-coded decimal numbers specifying the I/O address.

Another parameter that is provided by the user for execution by the block transfer programming sequence is a file address 38 where the block of I/O status data can be stored, as it is too large to be stored in the image table. This address is stored at an address in a second timers and counters area 39 that will be automatically searched in response to block transfer program instructions in the PC processor module 10 and the user-provided data address. If the I/O expansion module 20 is bidirectional, one address is stored for input and one address is stored for output. In FIG. 3 the file address 300 (octal) would be stored at location 130 (octal) and the file address 200 (octal) would be stored at location 131 (octal). The address word format includes three binary-coded decimal numbers specifying the file address.

The last parameter in the data table in FIG. 3 is a byte that includes the "done bits". These are stored in the input image location corresponding to the I/O address of the I/O expansion module 20. These "done bits" include the "R" (read done) and "W" (write done) bits, which are two highest order bits in the byte. For further information on the programming of block transfer instructions in a user program language, reference is made to a Mini-PLC-2/15 Programming and Operations Manual, copyright 1984, Allen-Bradley Company.

As seen in FIG. 3, the block transfer output file 40 includes a reserved area 41 for the header, an area 42 for the output status data for the first expansion rack 26 and an area 43 for the output status data for the second expansion rack 27. Similarly, the block transfer input file 44 includes a reserved area 45 for the header, an area 46 for the input status data for the first expansion rack 26 and an area 47 for the input status data for the second expansion rack 27. When the full capacity of the file storage areas 34, 35 is utilized, the files 40, 44 may contain data for the equivalent of seven second tier I/O racks, although in the present system, there is a limitation to two expansion racks and further I/O expansion is realized through connection of node I/O modules.

The above arrangement expands the I/O capacity of the in-rack processor 10 because it allows I/O status data from the storage areas 34 and 35 to be communicated to more than one I/O rack and thus the capacity of the controller system is increased. I/O status data can now be transferred from what was formerly a single-rack system to I/O modules in other racks or to remote I/O modules outside of any rack having a backplane. The I/O status data in the storage areas 34 and 35 may be operated on during execution of the user control program in the same manner as data in the image tables 32 and 33. The in-rack processor 10 still executes its I/O scanning sequence in the manner it would for a single-rack system.

The use of I/O node modules that are not disposed in any I/O rack increases the I/O capacity of the PC processor module 10 without a corresponding increase in rack hardware. This provides an economy in hardware because the link to additional I/O modules is a serial communication channel, which is lower in cost than additional rack hardware. Also, the serial communication channel offers improved resistance to spurious electrical signals—a basic technical problem in the industrial environment—because the serial communication channel can be shielded from such spurious signals using coaxial cable, twisted pairs and other noise immunity techniques.

C. Data Transfer Through the I/O Expansion Module

Figure 4:
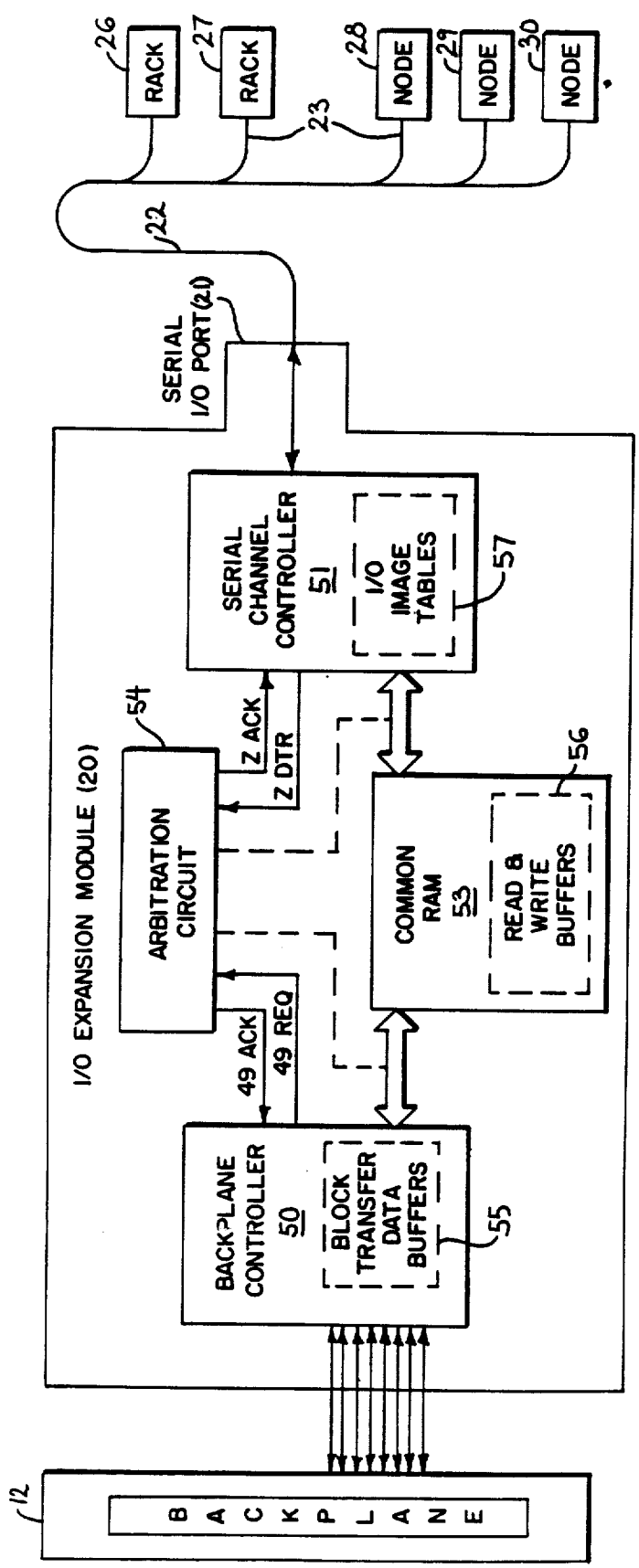
FIG. 4 is a general block diagram of the I/O expansion module of FIGS. 1-3.

Referring to FIG. 4, a backplane controller 50 in the I/O expansion module 20 cooperates with the in-rack processor 10 (not seen in FIG. 4) to execute the block transfer through the backplane 12. The I/O status data are stored in block transfer buffer areas 55 in memory.

On the other side of the I/O expansion module 20, the I/O status data are stored in I/O image tables 57 in the memory of a serial channel controller 51. The serial channel controller 51 is connected to the serial I/O port 21 to control transmission and reception of serial data traveling back and forth through the channel 22 from I/O modules outside the rack 11. The serial channel controller acts like the PC processor module 10 in transferring I/O status data to and from a sequence of destinations represented by different addresses. In addition, however, the data must be organized for transmission and extracted from signals received over the serial data channel.

To pass the I/O status data from one of the controllers 50, 51 to the other, the controllers 50, 51 are each connected to transfer data to and from a common random access memory (RAM) 53, which is also referred to more generally as a read/write type of memory. The controllers 50, 51 are also connected to an arbitration circuit 54 which allows the controllers 50, 51 to alternate access to the memory 53.

When power is applied to the primary equipment rack, the backplane controller 50 has priority access to the common RAM 53, by virtue of a 49 REQ line seen in FIG. 4. A signal on this line will cause the arbitration circuit 54 to return an active signal on the 49 ACK line, which is a signal that the common RAM 53 is available for the reading and writing of data by the backplane controller 50. Periodically, the backplane controller 51 will release its control of the common RAM 53 by removing the active signal from the 49 REQ line. If the serial channel controller 51 then generates a control signal, referred to as Z DTR in FIG. 4, the arbitration circuit 54 will return an active signal on a Z ACK line, and the common RAM 53 will be available to the serial channel controller 51 for reading and writing data.

Figure 5:
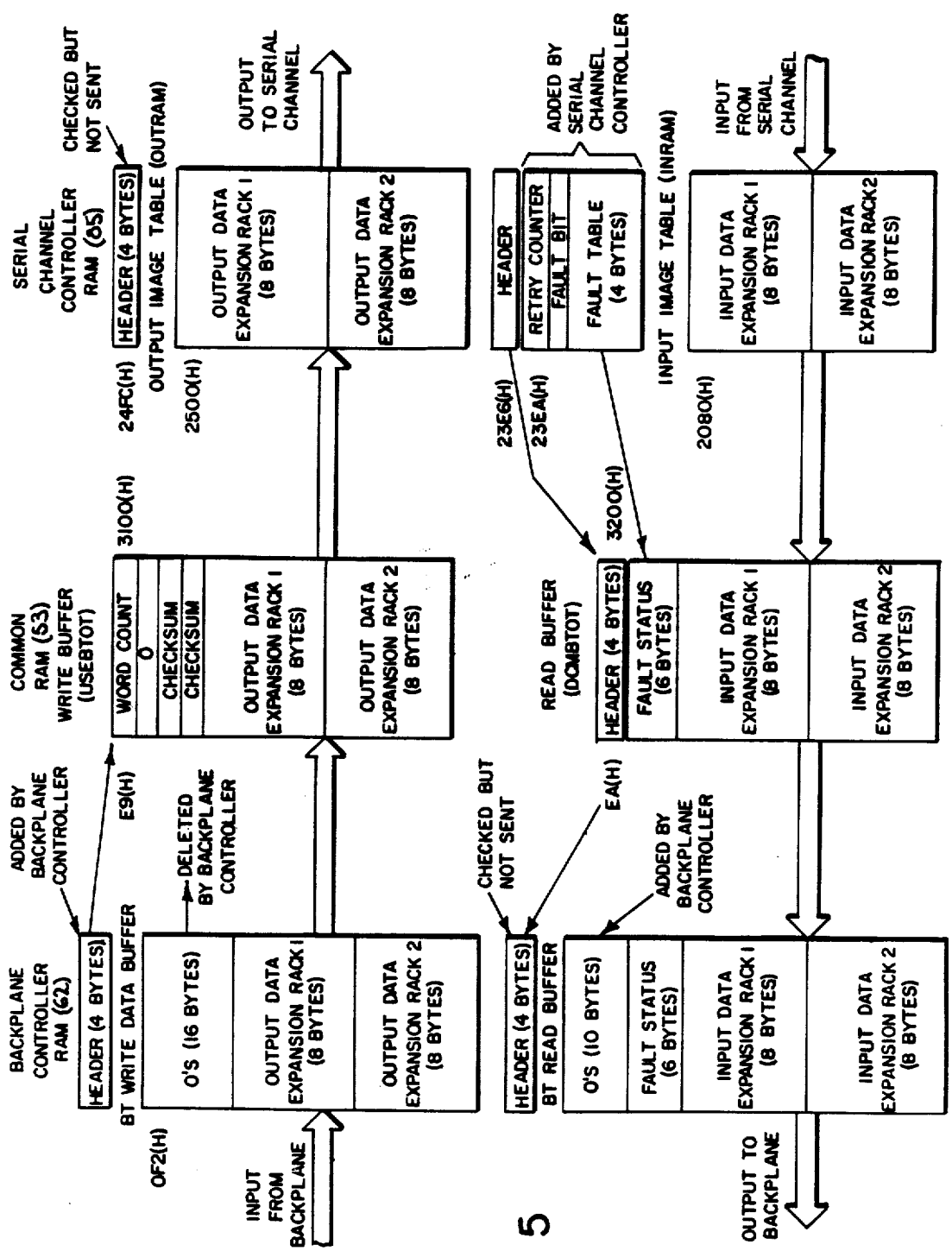
FIG. 5 is a map of certain areas in memory in the I/O expansion module of FIG. 4.

One of the buffers 55 in FIG. 4 is the BT WRITE BUFFER seen in FIG. 5, which is located in an area of a backplane controller RAM 62 starting at address 0F2(H), where (H) means a hexadecimal number. When a block of output status data is received through the backplane, the first eight bytes are zeros, the next eight bytes in this case are the output status data for EXPANSION RACK 1, and the next eight bytes are the status data for EXPANSION RACK 2. Output status data for the node I/O modules 28-30 would follow that for EXPANSION RACK 2. The backplane controller calculates a word count and a two-byte checksum for the block of data and this information is added to the block in the form of a header of four bytes (the second byte being all zeros). The eight bytes of zeros that were received are deleted and the four byte header is added for a net loss of four bytes in the total block. The block is transferred to a WRITE BUFFER in the common RAM 53. This WRITE BUFFER is labeled USEBTOT in Appendix B, and is addressed at E9(H) by the backplane controller 50.

When the block of output status data is to be transferred to the serial channel controller 51, the same WRITE BUFFER is addressed by the serial channel controller 51 at 3100 (H). The data are then transferred to an OUTPUT IMAGE TABLE starting at location 2500(H) in the memory of the serial channel controller 51. The OUTPUT IMAGE TABLE is allocated enough area in memory to accommodate the maximum size or I/O capacity that may be connected via the serial data channel. When the serial controller 51 begins its operation it sends messages to the rack adapters 24, 25 and to the node I/O modules 28-30, and based on reply messages the identity and size of the I/O racks 26, 27 and node I/O modules 28-30 are determined. Then, locations in the OUTPUT IMAGE TABLE are assigned to corresponding quarter-rack portions. Each quarter-rack portion includes four I/O slots or thirty-two I/O points.

Thus, in this example the first eight byte-sized locations are reserved for output status data for the eight I/O modules in EXPANSION RACK 1, the next eight byte-sized locations are reserved for output status data for the eight I/O modules in EXPANSION RACK 2, and the following areas (not shown) are reserved for output status data for the node I/O modules 28–30.

The header is transferred to the serial channel controller 51, and is stored in an area beginning at 24FC(H). The header is checked to verify the integrity of the output status data before it is sent to the output modules, but the header is not sent with the data over the serial data channel.

In the other direction, input status data is received over the serial data channel and is stored in an INPUT IMAGE TABLE beginning at 2080(H) in the serial channel controller RAM. This table is also organized on startup to provide locations that correspond to the I/O modules connected to the serial channel. In this example, the first eight byte-sized locations are reserved for input status data for the eight I/O modules in EXPANSION RACK 1, the next eight byte-sized locations are reserved for input status data for the eight I/O modules in EXPANSION RACK 2, and the following areas (not shown) are reserved for input status data for the node I/O modules 28–30.

The serial channel controller 51 calculates and adds a header to the block of input status data that will be sent to the common RAM 53. This header has the same format as the header added by the backplane controller 50 and is stored at location 23E6(H) in the serial channel controller RAM 85. The serial channel controller 51 also maintains a fault status table with a general fault bit, a communication retry counter and a table with individual fault bits for each quarter rack of I/O capacity. The complete fault status table includes six bytes and is stored at 23EA(H) in the serial channel controller RAM 85.

The header and the fault status table are transferred to a READ BUFFER in the common RAM 53 in a block of data that also includes the input status data. The READ BUFFER is referred to as DCMBTOT in Appendix B. It is addressed at 3200(H) by the serial channel controller 51 and at EA(H) by the backplane controller 50.

From the READ BUFFER, the block of data is transferred to the BT READ BUFFER which is the other of the buffers 55 seen in FIG. 4. This area of the backplane controller RAM 62 is addressed at either 0F0(H) or 0F1(H) depending on which one of two read buffers is selected. The header is transferred and is used to verify the integrity of the input status data, but it is not transferred through the backplane 12. Ten bytes of zeros and the six-byte fault status table are attached at the head of the data block for transfer through the backplane 12.

Thus far, the description has covered the transfer of data through the backplane 12, and the transfer of data through the I/O expansion module 20. The following discussion relates to the communication of serial data messages through the serial data channel 22 and 23 seen in FIGS. 1 and 2.

D. I/O Scan of the Second Tier of I/O Modules through the Serial Data Channel The serial channel controller 51 formats the data for transmission on the serial data channel 22 and 23, adding the necessary address and control information to send I/O status data to the remote racks 26, 27 and to the node I/O modules 28–30. The serial channel controller 51 also extracts incoming data from serial channel control information, and this can be organized into a block of I/O status data for return to the PC processor 10.

Figure 6:
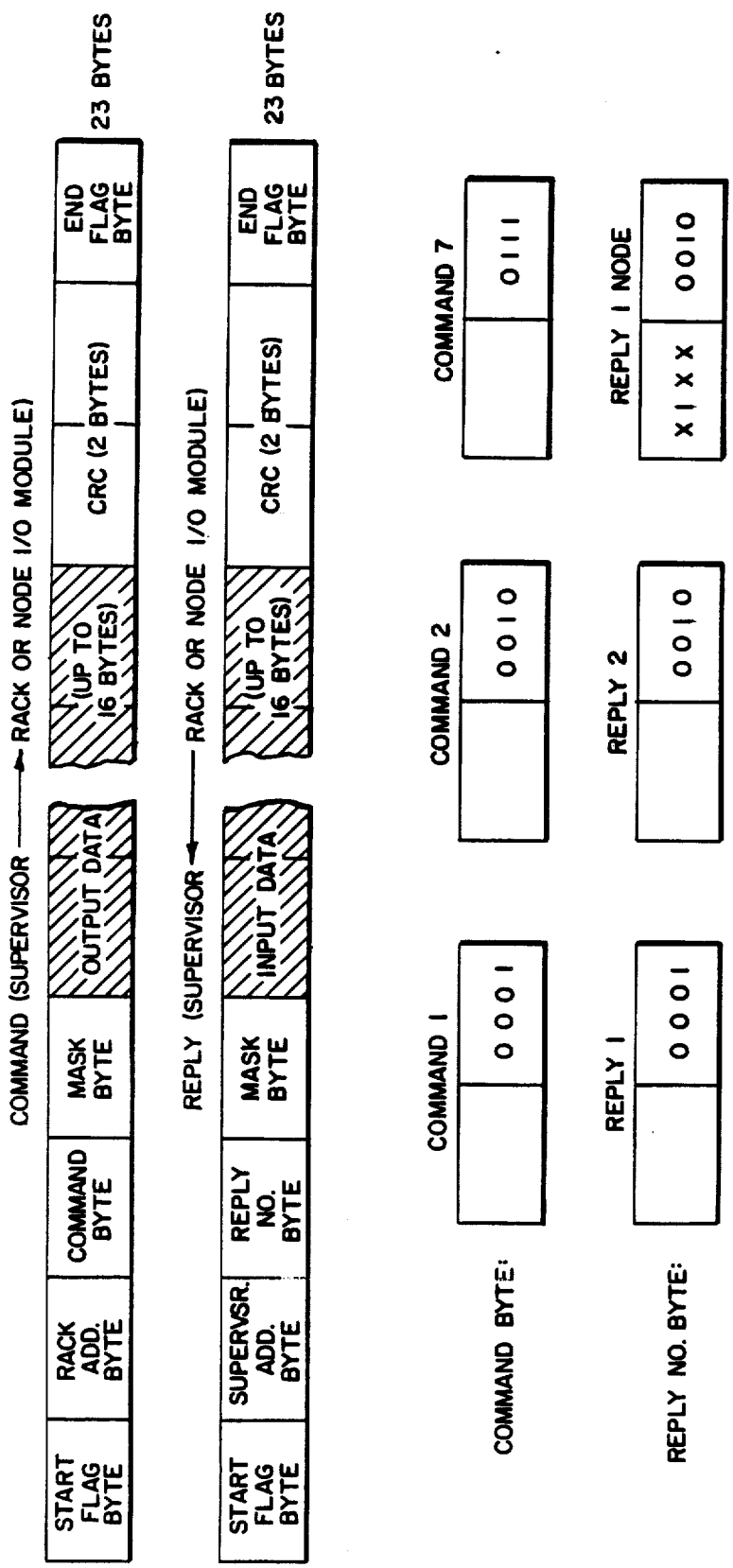
FIG. 6 is a map of a series of messages which are transmitted through the serial data link of the programmable controller of FIG. 1.

FIG. 6 illustrates the messages used for communication on the serial data channel 22 and 23. These are based on the protocol disclosed in Schultz et al., U.S. Pat. No. 4,413,319, cited earlier herein, and modified as indicated in the following description. Each message constitutes a string of data referred to more generally as a "frame". Generally, the frame for the messages is organized as follows:

START FLAG/DESTINATION
ADDRESS/COMMAND OR REPLY
NO./MASK/INPUT-OUTPUT STATUS
DATA/B.T. STATUS/CRC/END FLAG

The start and end flags are segments with values that the transmitting and receiving circuitry will recognize as the beginning and end of a frame, respectively. The destination address is the programmable controller system address of an I/O rack, for example. The I/O expansion module 20 is assigned a return address to be used by the remote I/O modules in returning communications. The destination address is followed by a segment that includes the identifying number for the Command or Reply message. The Command or Reply identifier segment is followed by a "mask" byte segment, which is a coded identification of the input or output status data that follows it. In the Commands, this is followed by up to sixteen bytes of output status data related to individual I/O slots in an I/O rack or their equivalent I/O capacity in a node I/O module. In the Replies, the mask byte is followed by up to sixteen bytes of input status data. Again, this data is related to individual I/O slots in a rack or their equivalent I/O capacity in a node I/O module. With a CRC segment of two bytes and an end flag byte a Command or Reply message may contain up to 23 bytes of information.

The message segments in the present example are organized in terms of one or more "bytes" having eight individual bits of data associated together. These bytes may in some instances be referred to as "words", which is a more general term for describing data strings of four bits, eight bits, sixteen bits, or even thirty-two bits in length. Although the description herein is largely in terms of bytes, it should be apparent that the invention can be used with data words of other sizes.

When one of the messages of FIG. 6 is transmitted through the serial data channel 22 and 23 of FIGS. 1 and 2, it travels to all of the racks and node I/O modules hooked up to it, but only the rack or node I/O module that has an address matching the address in the Command message will respond with a Reply message. At the racks 26 and 27, Command message interpretation and Reply message generation is handled by the adapter modules 24 and 25. These modules 24 and 25 also transfer the I/O status data to and from the I/O modules 13 through the backplanes of racks 26 and 27. This transfer is transparent ("not seen") by the I/O expansion module 20.

Communication on the serial channel 22 and 23 is carried out in a half-duplex mode, meaning that first a message is sent in one direction through the serial channel 22 and 23, and then a message is returned in the opposite direction. At any particular time the channel 22 and 23 supports a single message traveling in a single direction.

In FIG. 6 there are three different Command messages, Commands 1, 2 and 7, which have the same basic organization, however, they are distinguished according to their respective Command bytes. There are also three different Reply messages, Reply 1, Reply 2 and Reply 1 Node which have the basic organization shown for a Reply message in FIG. 6.

Upon startup the first message to be sent is a Command 1 message. The Command byte for this message is characterized by the four-bit binary number "0001" in its lower half as seen in FIG. 6. The Command 1 message is a polling message which seeks replies from the I/O racks and node I/O modules to provide the I/O expansion module 20 with initial information on the number, size and distribution of remote I/O modules along the serial data channel 22 and 23. When the Command 1 message is sent, the outputs connected to the remote I/O modules are held reset, so the output status data is not communicated to its normal destination.

Assuming the Command 1 message is received by an adapter module in one of the I/O racks 26, 27 with a matching address, it will respond with a Reply 1 message as seen in FIG. 6. After its start flag byte, a return address byte for the I/O expansion module 20 is inserted in the Reply 1 message, followed by a Reply identification byte. This byte is followed by the mask and the input data from the I/O modules in the rack 26, 27.

If, on the other hand, only node I/O modules 28–30 were connected to the serial data channel, and the Command 1 message is received with a matching address by one of them, the node I/O module will respond with a Reply 1 Node message in which "bit 6" of the Reply identification byte is set to a logic "1" to indicate a response by a node I/O module. Either one of these Reply messages will also include the mask, the input data, the CRC segment of two bytes and the end flag byte.

If Reply 1 messages are received from the adapter modules 24, 25 in the two I/O racks 26, 27 of the type seen in FIG. 1 in response to two Command 1 messages, the I/O expansion module 20 will next send one or more Command 7 messages to establish communication with the node I/O modules 28–30. As seen in FIG. 6, the Command 7 message contains the same bytes as a Command 1 message, except that its Command number or Command identification byte contains a "7" ("0111" in binary) instead of a "1" ("0001" in binary). When any of the node I/O modules 28–30 receives a Command 7 message with a matching address, it will respond with Reply 1 Node message in the same way it would have responded to a Command 1 message if the I/O racks 26, 27 were not present. The polling sequence includes a limited number of Command 1 messages to limit the number of I/O racks 26, 27 that can be connected to the I/O expansion module 16. The limited number of Command 1 messages are followed by Command 7 messages to establish the number of node I/O modules 28–30 connected to the serial data channel.

As seen in FIG. 6, the Command 2 message and the Reply 2 message have the same organization as the Command 1 message and the Reply 1 message, respectively. The Command 2 message is sent after the I/O expansion module 20 and the remote I/O modules have initiated communication, so the outputs are no longer held reset, and the output data will be used in controlling output devices. The sequence of sending the Command 1 message, receiving the Reply 1 message, and then sending the Command 2 message means that input data from a rack 26, 27 or a node I/O module 28–30 is received by the I/O expansion module 20 and the processor 10 before output data is sent back. The Command 2 message and the Reply 2 message are then transmitted back and forth to couple I/O status data of the type that is exchanged between the processor 10 and the I/O modules 13 in the first rack 11 during an I/O scan sequence. By generating Command 2 messages with a sequence of addresses, the serial channel controller 51 demultiplexes or distributes data to various destinations through a common communication channel. By receiving the corresponding Reply 2 messages, the controller 51 multiplexes or collects I/O status data from various sources.

Details of the Circuitry for the I/O Expansion Module

Figure 7:
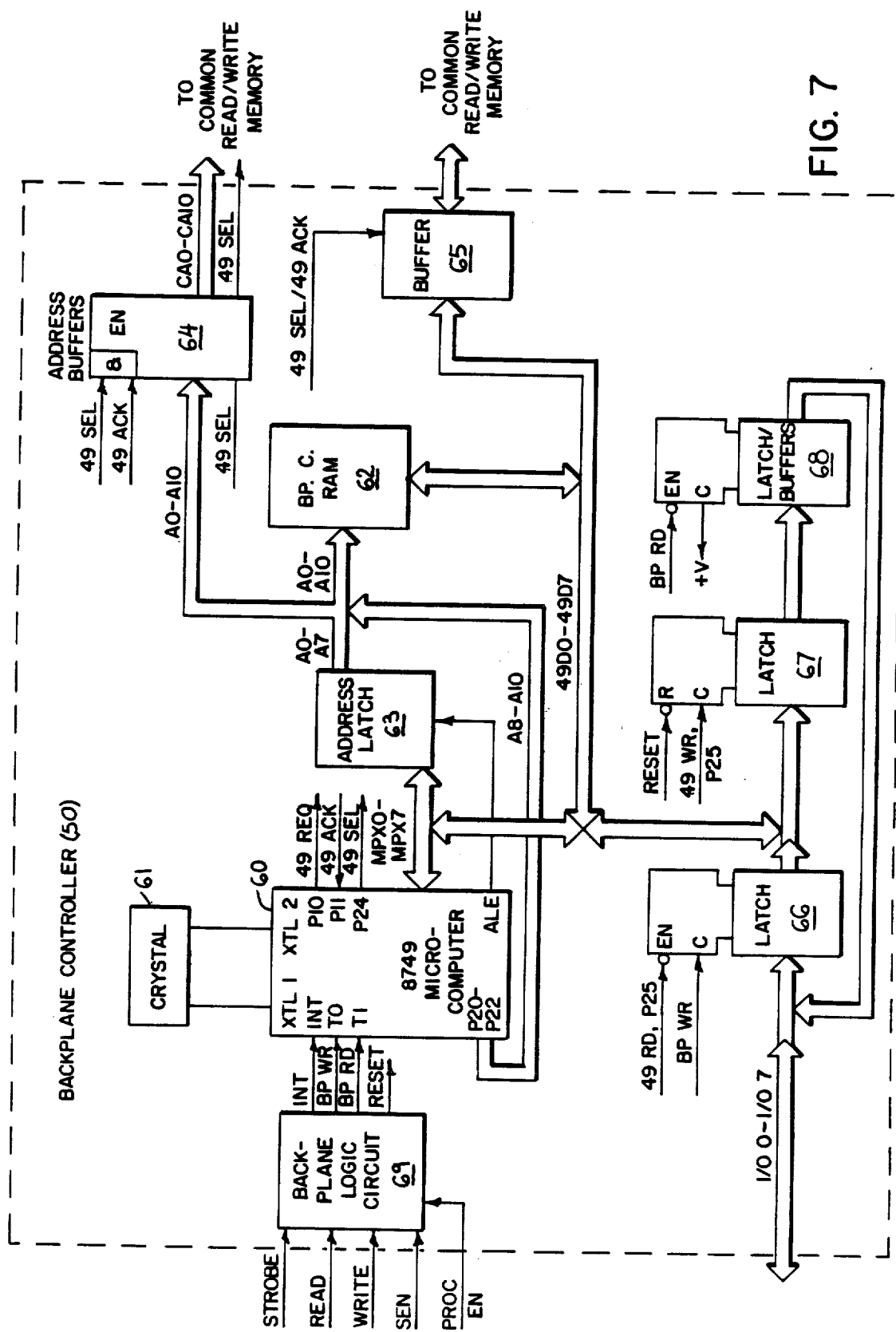
FIGS. 7 and 8 are more detailed block diagrams of the I/O expansion module of FIG. 4.
Figure 8:
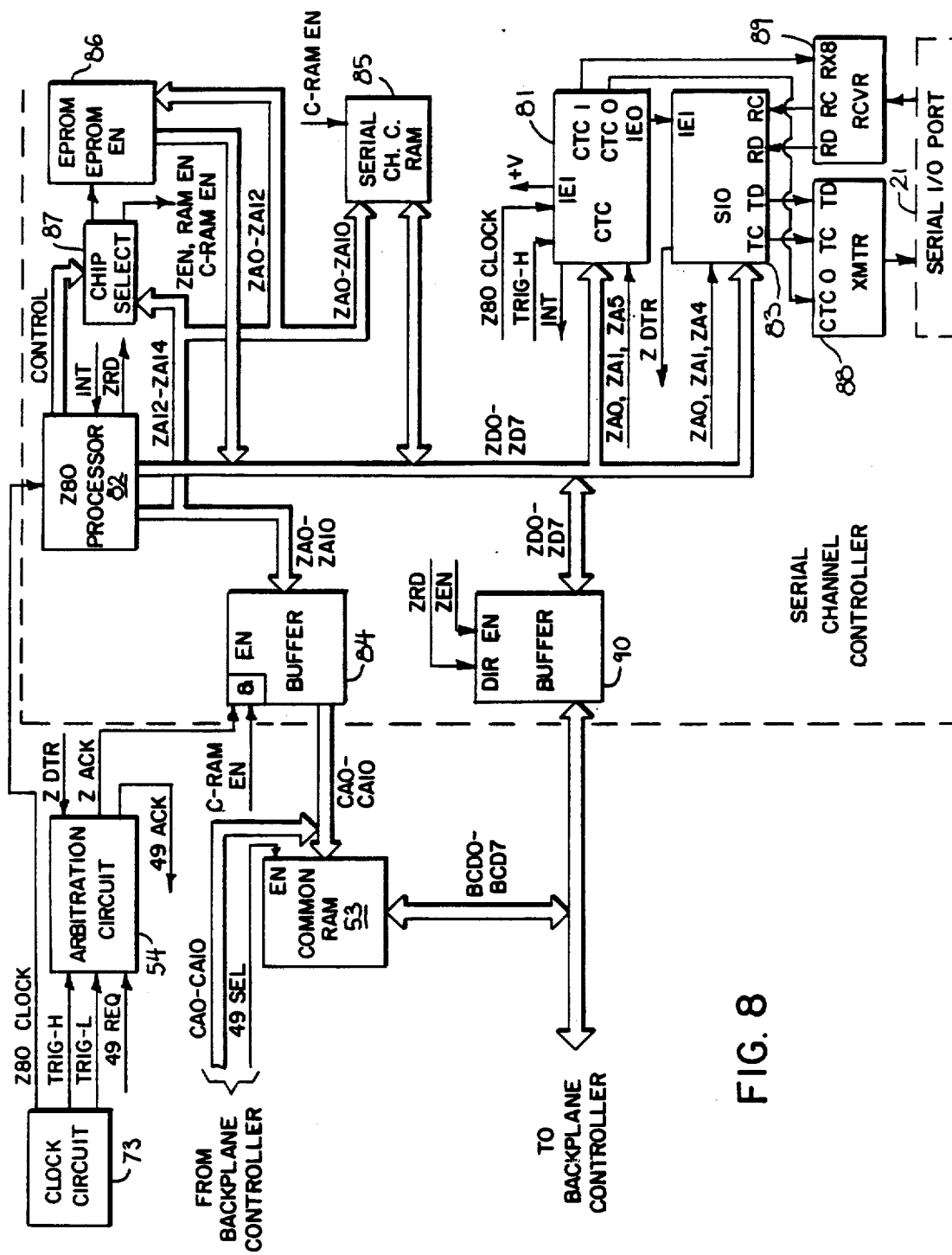

FIGS. 7 and 8 show the details of the serial channel controller 51 and the backplane controller 50. The backplane controller 50 in FIG. 7 is connected by address, control and data lines to the common RAM 53 and to the arbitration circuit 54 in FIG. 9.

The backplane controller 50 of FIG. 7 cooperates with the in-rack processor 10 to carry out block transfer of I/O status data. The key controlling element in this controller 50 is a backplane microcomputer 60, which in this embodiment is an 8-bit Model 8749 microcomputer available from Intel Corporation. This device combines a CPU with 2k bytes of EPROM (erasable programmable read-only memory) and a 128-byte internal RAM. A crystal 61 connects to a pair of XTL inputs on the processor to control the frequency of clock signals for the CPU. Further details regarding the architecture, operation and instruction set for this microcomputer 60 are described in commercial literature available from Intel Corporation.

To summarize the elements of the backplane controller 50 shown in FIG. 7, the microcomputer 60 has eight bidirectional, multiplexed bus terminals MPX0–MPX7 for receiving or transmitting a byte of data, or for transmitting a byte of address information. These terminals connect to corresponding lines MPX0–MPX7 in an eight-bit multiplexed bus, to couple the backplane microcomputer 60 to a backplane controller RAM 62. The multiplexed bus is divided into a data bus branch with lines 49D0–49D7 and an address bus with lines A0–A7. The data bus lines 49D0–49D7 connect to data terminals on the RAM 62. The multiplexed lines MPX0–MPX7 are coupled through an address latch 63 to the address bus, which then connects to the eight lower order address terminals on the external RAM 62.

The microcomputer 60 also has two eight-bit I/O ports, Port 1 having terminals P10–P17 and Port 2 having terminals P20–P27. These I/O ports are referred to as "quasi-bidirectional" because each terminal is able to function as either an input or an output, and inputs and outputs can be mixed within each I/O port. In I/O Port 1, for example, a 49 REQ signal from output P10 and a 49 ACK signal at input P11 are handshaking signals for operation of the microcomputer 60 with the arbitration circuit 54.

In I/O Port 2, terminals P20–P22 connect to three higher order address lines to convey three additional address signals. The RAM 62 and the common RAM 53 each store 2k bytes of data, and the address lines A8–A10 convey signals to address 8 pages of 256 bits each. A signal from output P23 selects the RAM 62, while a signal on line P24 selects the common RAM 53. The 49 SEL signal from output P24 is also logically combined with the 49 ACK signal from the arbitration circuit 54 to enable the buffers 64 and 65 that control access by the microcomputer 60 to the common RAM 53.

Other signals from I/O Port 2 are generated when the microcomputer 60 reads and writes data on the backplane data bus (lines I/O 0–I/O 7). A signal from output P25 in I/O Port 2 enables the outputs on latch 66, so that the microcomputer 60 can read I/O status data from the backplane. A signal from output P25 is also used to clock data into latch 67. The functions for the other specific terminals in the I/O ports are given in Appendix B.

Referring again to FIG. 7, the microcomputer 60 also has an INT input for receiving maskable interrupt signals, and two test inputs T0 and T1 which can be tested for the presence of a signal with conditional jump instructions. These inputs are connected to receive signals on an INT line, a backplane read (BP RD) line and a backplane write (BP WR) line. The signals to the INT, T0 and T1 inputs are generated by a backplane logic circuit 69 in response to a standard set of backplane control signals: STROBE, READ, WRITE and SEN (slot enable). This latter set of signals is generated by the in-rack processor 10.

The transfer of blocks of I/O status data from an in-rack system processor 10 to an I/O module has previously been described in Struger et al., U.S. Pat. No. 4,293,924, cited earlier. To briefly review the procedure with reference to FIG. 7, the in-rack processor generates address and control signals which produce an SEN signal and, either a READ signal for a read operation or a WRITE signal for a write operation. In either event the backplane logic circuit 69 generates an INT signal to the INT input on the 8749 microcomputer 60. This causes the microcomputer 60 to jump or "vector" to a particular location in its on-board EPROM to execute a certain sequence of its firmware instructions. The backplane signals also cause either a BP RD signal or a BP WR signal to be coupled to its respective T0 or T1 input. In executing its firmware instructions, the microcomputer 60 will test these inputs to determine whether a read or write operation is being signaled.

I/O status data is transferred on lines I/O 0–I/O 7 when either the BP RD or BP WR signal is present. An I/O read operation is a transfer from the 8749 microcomputer 60 to the in-rack processor 10. An I/O write operation is a transfer from the in-rack processor 10.

For an I/O read operation, a byte of I/O status data is coupled from the latch/buffer circuit 68 to the I/O data bus when the BP RD signal enables this circuit at its EN input. Data is loaded into the latch 68 from the outputs of latch 67, which received the data from the 8749 microcomputer 60. In a preceding operation, data has been coupled to the latch 67 on lines 49D0–49D7, while the latch has been clocked by a signal derived from control signals from a WR terminal on the 8749 microcomputer (a write control signal terminal which is not shown) and the P25 terminal (not shown) on the microcomputer 60. The P25 terminal is active when the microcomputer 60 is to send or receive data through the backplane.

During system startup, a reset signal, derived from a processor enable (PROC EN) signal, is coupled to a reset (R) input on latch 67. This clears the latch to receive the first byte of data from the 8749 microcomputer 60. In subsequent operations, new data from the 8749 microcomputer 60 simply "overwrites" or takes the place of previous data in latch 67.

For an I/O write operation, a byte of I/O status data on the I/O data bus is loaded into the latch 66 when the BP WR signal on the backplane is transmitted to the clock (C) input on the latch 66. The 8749 microcomputer 60 reads data from the latch 66 by generating a read control signal from an RD terminal on the 8749 microcomputer (a read control signal terminal which is not shown) and a control signal from the P25 terminal (not shown), which are coupled to an output enable (EN) terminal on the latch 66.

Both the I/O read operation and the I/O write operation begin with an interrupt of the 8749 microcomputer 60 and the writing of control information to the microcomputer 60 through latch 66. By testing the inputs T0 and T1, and by reading control information from the latch 66, the 8749 microcomputer 60 is able to set up communication with the in-rack processor 10 to transfer a block of I/O status data of up to 128 bytes in the selected direction.

Figure 9:
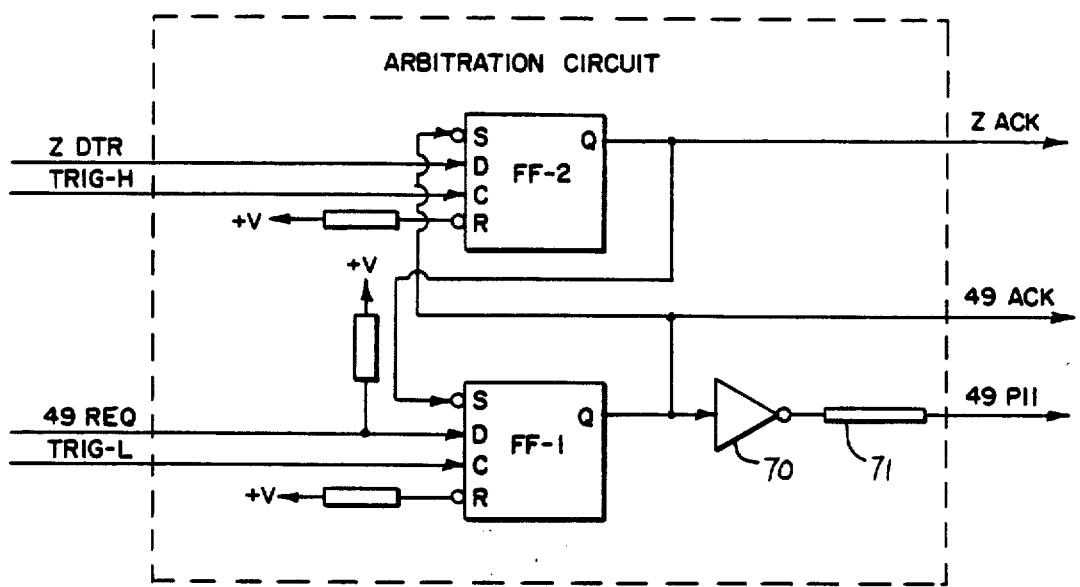
FIG. 9 is a detailed schematic of the arbitration circuit seen in FIG. 4.

Referring to FIG. 9, the arbitration circuit 54 will now be described. A clock circuit 73 in FIG. 8 generates a TRIG-H signal and a TRIG-L signal by clocking a D-type flip-flop (not shown) with the CLOCK signal, and taking the TRIG-H signal and the TRIG-L signal from the Q and -Q outputs, respectively. The Q output is connected back to the D input through an inverter so that the states of the two outputs toggle on each rising edge of the Z80 CLOCK signal. The TRIG-H signal and the TRIG-L signal are used as the clock signals for a pair of flip-flops FF-1 and FF-2 in FIG. 9.

The 8749 microcomputer 60 transmits a logic low signal (49 REQ) from terminal P10 to the D input of flip-flop FF-1 to request access to the common RAM 53. When this flip-flop is clocked by the TRIG-L signal, the Q output of this flip-flop is set low-true. This output is connected to the 49 ACK line, and to an inverter 70 and resistor 71 to transmit a high-true signal back to terminal P11 on the 8749 microcomputer 60 that it has access to the common RAM 53. Signals on the 49 ACK line and the 49 SEL line, the latter being coupled from terminal P24 through a buffer (not shown), are the signals for enabling address buffers 64 in FIG. 7 to couple address signals A0–A10 from the 8749 microcomputer 60 to the common RAM 53. The 49 ACK line is also connected to a low-true set (S) input of the second flip-flop FF-2 to hold its Q output in a high-false state. This Q output connects to the Z ACK line, and thereby prevents a Z80 microprocessor 82 from gaining access while the 8749 microcomputer 60 has access to the common RAM 53.

At certain times the 8749 microcomputer 60 gives up access to the common RAM 53 by signaling a logic high signal from its P10 output to the D input on flip-flop FF-1. On the next TRIG-L clock signal, the Q output goes high to remove both the active 49 ACK signal and the signal holding flip-flop FF-2. The Z80 microprocessor 82 signals through an SIO circuit 83 and the Z DTR line to the D input of flip-flop FF-2 to request access to the common RAM 53. On the next TRIG-H signal, the Q output of the second flip-flop FF-2 goes low-true to enable the address buffers 84 for coupling address signals A0-A10 from the Z80 microprocessor 82 to the common RAM 53.

When the Z80 microprocessor 82 has access to the common RAM 53, access is denied to the 8749 microcomputer 60 by the transmitting a low-true signal to the set (S) input of flip-flop FF-1 through the Z ACK line. The Z80 microprocessor 82 releases the common RAM 53 by changing the state of the Z DTR line to a logic high, and on the next active TRIG-H signal, the Q output of flip-flop FF-2 is switched high or "off".

Referring to FIG. 8, the serial I/O port 21 connects to the serial channel controller 51 through three outputs on a transmitter (XMTR) circuit 88 and three inputs on a receiver (RCVR) circuit 89. The XMTR circuit 88 is connected to receive transmit clock (TC) signals and transmit data (TD) signals from a serial input/output (SIO) circuit 83, which in the preferred embodiment is a Z80-SIO circuit available from Zilog, Inc. These signals are further timed with reference to a CTC 0 clock frequency received from a counter/timer (CTC) circuit 81, which in the preferred embodiment is a Z80-CTC circuit available from Zilog, Inc. The XMTR circuit 88 encodes serial data as a Manchester-coded signal, which is then transmitted through the serial I/O port 21.

The RCVR circuit 89 is connected to pass the Manchester-coded signals to the SIO circuit 83 on the receive data (RD) line and to recover the "receive clock" (RC) signals from the data stream. It then passes the RC clock signals to the SIO circuit 83. An RX8 clock frequency is generated by the CTC circuit 81 and is used by the RCVR circuit 89 to assist in recovering the RC clock signals from the Manchester-coded transmission signals.

The SIO circuit 83 is a two-channel, programmable peripheral circuit. Its primary function is to convert between serial data and parallel data. It also handles data according to various serial data protocols. The SIO circuit 83 is connected to the microelectronic CPU or microprocessor 82 through eight lines (ZD0-ZD7) of a Z80 data bus to receive control information or data to be sent to it from the microprocessor 82, or to transmit control information or data to the microprocessor 82. Control/status signals, channel select and chip select signals are transmitted to the SIO circuit 83 through lines ZA0, ZA1 and ZA4 of a processor address bus.

The CTC circuit 81 is four-channel component for providing timing or counting functions from internal timers and counters that can be programmed via control information received from the microprocessor 82. The control information or data is sent to the CTC circuit 81 from the microprocessor 82 through the eight lines (ZD0-ZD7) of the Z80 data bus. Two binary-coded channel select signals are sent to the CTC circuit 31 on lines ZA0 and ZA1 of the processor address bus, while a chip select signal is coupled on line ZA5. Two channels of the CTC circuit 81 are incremented by a trigger signal (TRIG-H), and two other channels of the CTC circuit 81 are incremented by a Z80 CLOCK signal. Both the TRIG-H and Z80 CLOCK signals are generated by the clock circuit 73.

The SIO and CTC circuits 83 and 81 are connected in an interrupt priority chain through interrupt enable inputs and outputs. The interrupt enable input (IE1) on the CTC circuit 81 is pulled high, while the interrupt enable output (IE0) is connected to IE1 input on the SIO circuit 83. This gives the CTC circuit 81 priority over the SIO circuit 83 in generating interrupts to the microprocessor 82. Interrupt request (INT) outputs on both the SIO and CTC circuits 83 and 81 are connected in common to an interrupt (INT) input on the microprocessor 82. The microprocessor 82 reads a byte of information sent to it over the Z80 data bus to distinguish which of these devices is sending an interrupt signal and the nature of the interrupt signal. For example, the SIO circuit 83 generates four different types of interrupts, including XMIT BUFFER EMPTY interrupts during serial data transmission, and three other types of interrupts, the RECEIVE CHARACTER interrupt, the SPECIAL RECEIVE interrupt, and an EXTERNAL STATUS interrupt during reception of serial data.

This has been by way of a general introduction to these sophisticated peripheral circuits. For a full definition of their architecture and functions, reference is made to the Z80-SIO and Z80-CTC Technical Manuals and other commercial literature available from Zilog, Inc. For operation of the Z80 microprocessor 82, the Z80-SIO circuit and the Z80-CTC circuit for I/O scanning, reference is made Schultz et al., U.S. Pat. No. 4,413,319, issued Nov. 1, 1983.

In this example, the Z80 microprocessor 82 is driven at a suitable frequency by CLOCK signals received from the clock circuit 73 shown in FIG. 8. The Z80 microprocessor 82 accesses a 2k-byte external random access memory, referred to earlier as the serial channel controller RAM 85, for temporarily storing and formatting data and for storing control and status information. The Z80 microprocessor 82 also accesses an 8k-byte erasable and programmable read-only memory EPROM 86, which is seen in FIG. 8, and which stores processor instructions that are read and executed by the microprocessor 82 to perform its many functions. Since these instructions are encoded in the physical structure of the EPROM 86, and are retained even if power is turned off, they are referred to as "firmware".

The Z80 microprocessor 82 controls the reading of processor instructions from the EPROM and the reading and writing of data in the RAM 85 by generating addresses through lines ZA0-ZA14 of a sixteen-line address bus (line ZA15 not being used). Lines ZA0-ZA10 connect to address inputs on the RAM 85 to address 2k bytes of data. Lines ZA0-ZA12 connect to address EPROM 86 to address 8k bytes of processor inputs on the firmware instructions. The data and firmware are actually communicated between the microprocessor 82 and the respective memories 85, 86 through the eight lines ZD0-ZD7 of the Z80 data bus. To activate or enable the various circuits, signals on lines ZA12-ZA14 are coupled to a chip select circuit 87, where they are decoded to select one or the other of the memories 85, 86, or the bus-controlling buffers 84, 90 according to their assigned address and the address present on the address bus.

The Z80 microprocessor 82 also communicates with the common RAM 53, so that data is passed between the serial channel controller 51 and the backplane controller 50. Lines ZA0-ZA10 of the Z80 address bus are coupled through buffer 84 to address inputs on the common RAM 53 to address 2k bytes of data. Lines ZD0-ZD7 of the Z80 data bus are coupled through buffer 90 to a common memory data bus, which connects to the data inputs on the common RAM 53. The data buffer 90 is enabled at an enable (EN) input through a ZEN line by a signal decoded by the chip select circuit 87. A directional input DIR on the buffer 90 is controlled by the logic state of a read (ZRD) control signal transmitted by the Z80 microprocessor 82. The address buffer 84 is enabled when two control signals are received, the first is the Z ACK signal from the arbitration circuit 54, and the second is a C-RAM EN signal decoded by the chip select circuit 87 from the signals on lines ZA12-ZA14.

This completes the description of the electronic hardware used in carrying out the invention, except that a list of commercially available circuits for carrying out the invention is provided in Appendix A.

F. Programmed Operation of the Microelectronic Processors

Figure 10:
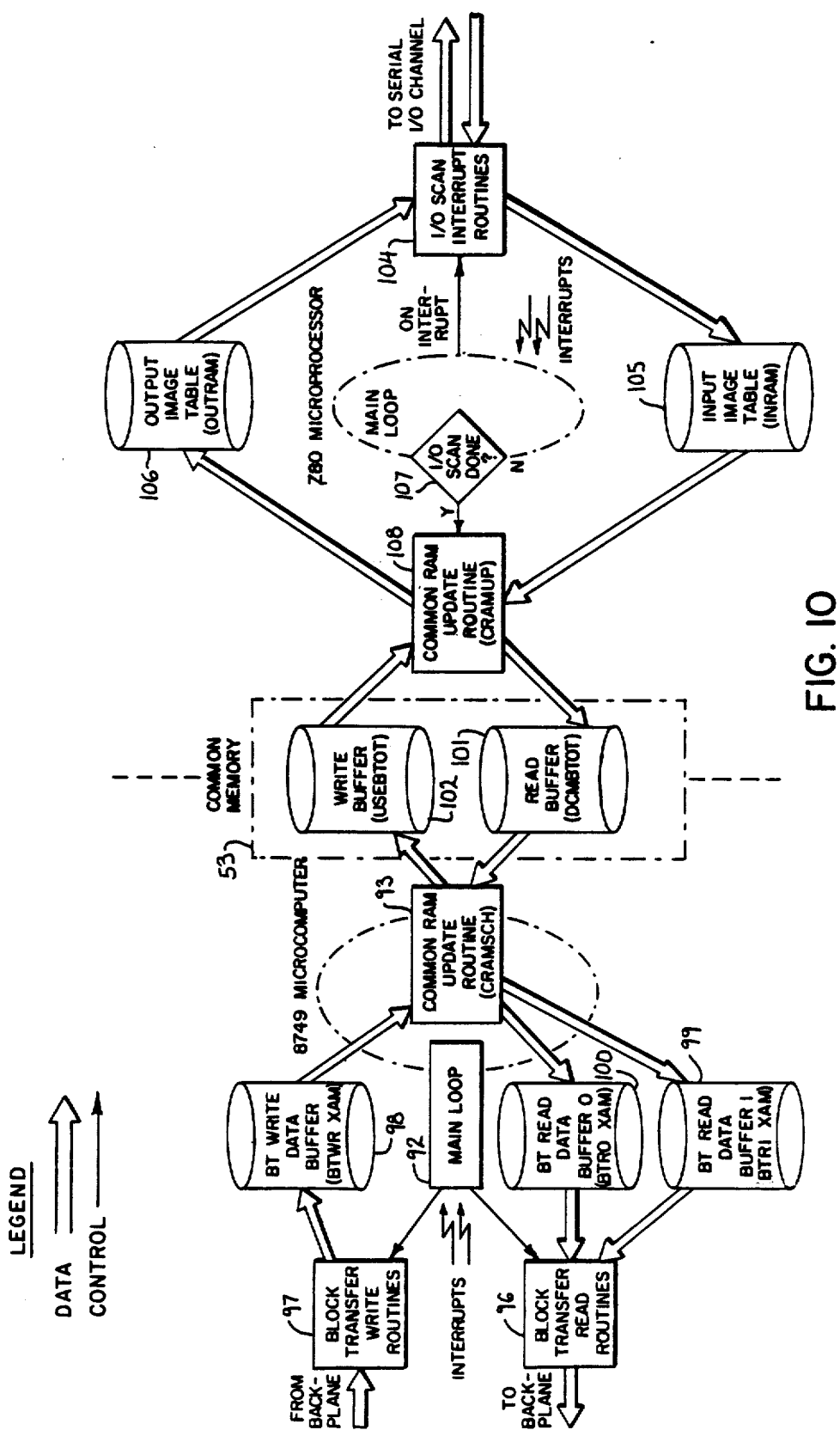
FIG. 10 is a program and data flow schematic diagram showing the operation of the I/O expansion module of FIG. 4.

FIG. 10 shows the relationship of the programs for the processors 60, 82 to the transfer of data through the I/O expansion module 20. The left side of the figure shows a representation of the 8749 microcomputer 60 as it executes a main loop of firmware instructions 92 that are fetched from its on-board EPROM. These and the other instructions for carrying out the operations of the backplane microcomputer are listed in Appendix B.

The main loop of instructions 92 contains a call to a CRAMSCH subroutine 93 for transferring I/O status data between the buffers 98-100 in the backplane controller RAM 62 and the buffers 101, 102 in the common RAM 53. During execution of the main loop 92, the 8749 microcomputer 60 may receive interrupt signals through the backplane control logic circuit 69 as explained in relation to FIG. 7. When this occurs, the 8749 microcomputer 60 will interrupt execution of the main loop 92 to execute either a group of block transfer "read" routines 96 or a group of block transfer "write" routines 97 according to the exact type of interrupt signal sequence. One exception to this is that the CRAMSCH subroutine will be executed at least once before further interrupt signals will be recognized, so that the operations concerning the common RAM 53 can be completed before handling another transfer through the backplane. This assures that data is not lost through the interruption of one transfer by another.

The instructions for the block transfer "read" routines 96 and the block transfer "write" routines 97 are listed in Appendix B. For further description of these routines, reference is made to a copending application of Floro et al., Serial No. 793,589, filed Oct. 31, 1985, and assigned to the assignee of the present invention.

In FIG. 10 the block transfer "write" routines 97 are executed to read a block of data into the BT WRITE DATA BUFFER 98 (identified as BTWR@XAM in Appendix B) from the PC processor 10 in FIG. 1. The contents of the block of data were discussed previously in relation to FIG. 5. As seen in FIG. 10, the execution of the CRAMSCH subroutine 93 moves the data to the WRITE BUFFER 102 in the common RAM 53. The CRAMSCH subroutine 93 is also executed to move I/O status data from READ BUFFER 101 in the common RAM 53 to the BT READ DATA BUFFER 99 (identified as BTR1@XAM in Appendix B). From there it is transferred through the backplane by execution of the block transfer "read" routines 96.

When data in the first BT READ DATA BUFFER 99 has not yet been transferred to the backplane, a second BT READ DATA BUFFER 100 (identified as BTR0@XAM in Appendix B) receives the next block of I/O status data from the common RAM 53. This protects the data in the first BT read data buffer 99 until it can be transferred through the backplane via a read block transfer executed by the PC processor 10 in cooperation with the 8749 backplane microcomputer 60.

On the right side of FIG. 10, the Z80 microprocessor 82 executes a main loop of firmware instructions 103 that are fetched from its associated EPROM 86. These and the other instructions executed by the Z80 microprocessor 82 are listed in Appendix C. During execution of these instructions, interrupt signals may be received from the SIO circuit 83 and the CTC circuit 81. These signals will cause the Z80 microprocessor 82 to jump to one of a group of I/O scan interrupt routines 104.

The I/O scan interrupt routines are generally of the type disclosed in Schultz et al., U.S. Pat. No. 4,413,319. Instructions have been added to these routines to handle data as described earlier in relation to FIG. 5, and to generate messages for the node I/O modules as described earlier in relation to FIG. 6. Execution of certain I/O scan interrupt routines 104 will cause input status data to be extracted from incoming messages and stored in an INPUT IMAGE TABLE (INRAM) 105 in the serial channel controller RAM 85 as discussed earlier in relation to FIG. 5. Execution of other I/O scan interrupt routines 104 will cause output status data in an OUTPUT IMAGE TABLE (OUTRAM) 106 in the serial channel controller RAM 85 to be formatted in messages that are transmitted over the serial data channel.

Periodically, during execution of the main loop of instructions 103, an instruction represented by decision block 107 is executed to determine whether there has been communication with all of the adapters and node I/O modules connected to the serial data channel. If the result is positive, as represented by the "YES" branch, the Z80 microprocessor 82 executes a common RAM update routine (CRAMUP) represented by block 108. If the result is negative, the execution of the CRAMUP routine will be delayed until the serial channel I/O scan is complete. The CRAMUP routine 108 contains instructions for moving output status data from the WRITE BUFFER 102 to the OUTPUT IMAGE TABLE 106. The CRAMUP routine also contains instructions for transferring input status data from the INPUT IMAGE TABLE 105 to the READ BUFFER 101.

This has been a general description to assist the understanding of the operations of the 8749 microcomputer 60 and the Z80 microprocessor 82. For a full functional definition of the operation of these circuits, reference is made to the listings of firmware instructions in Appendices B and C.

G. The Node I/O Modules

Figure 11:
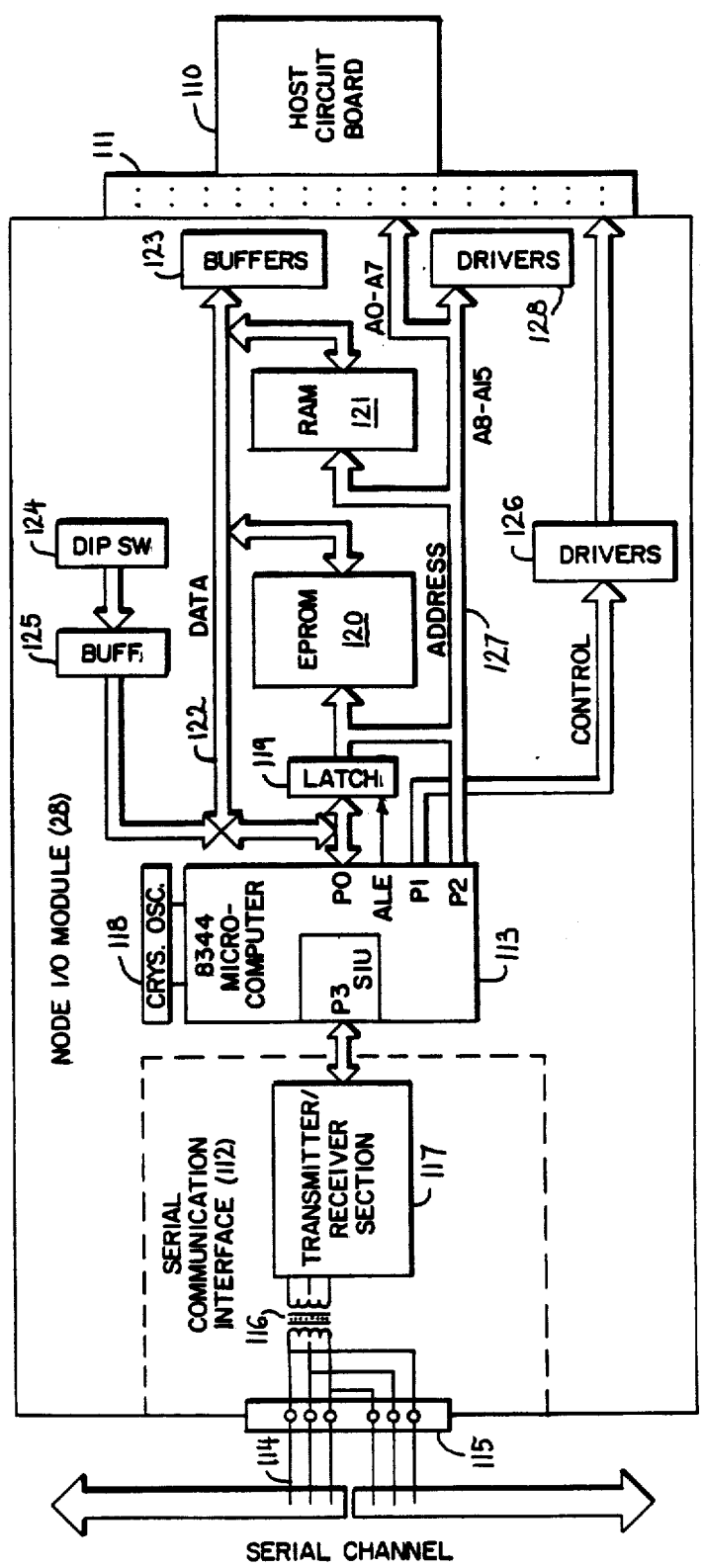
FIG. 11 is a block diagram of one of the node I/O modules represented in FIGS. 1 and 2.

FIG. 11 shows a hardware block diagram on one of the three identical node I/O modules 28-30. The node I/O module 28 is designed as a general communication interface for a variety of specific applications. It is programmed to carry out its communication functions and to interface with the user application. The host board 110 contains the application-specific circuitry and programming.

The nodes I/O modules 28-30 are a type of adapter module. Each module 28-30 communicates through the serial data channel as a type of adapter module. Unlike the conventional adapter modules 24, 25, which are adapted for plugging in and communicating through a rack backplane, the node I/O modules 28–30 are adapted to connect to the host circuit board 110 through a 60-pin connector 111. This connection may be through a ribbon cable or a socket on the host circuit board 110 to allow flexibility in arranging the two boards 28, 110.

On the left side of FIG. 11, which is the front side of the node I/O module 28, there is a serial communication interface 112 for interfacing a microcontroller 113 to the serial data channel. The lines in the serial data channel include six wires 114 that may be fastened to terminals on a connector 115 positioned on the front edge of node I/O module 28. The six wires 114 connect in two parallel three-wire groups to one side of an isolation transformer 116. Three of the wires 114 are for receiving signals from the serial data channel, while the other three wires 114 are for transmitting signals over the serial data channel. Each set of three wires includes one line for a serial clock signal, one line for a serial data signal, and one line for signaling when the channel is idle. The other side of the transformer 116 is connected to a transmitter/receiver section 117 of a type known in the art for encoding transmission signals and decoding reception signals.

The microcontroller 113 is an Intel 8344 Microcontroller. This is a very large scale integrated (VLSI) circuit that combines a CPU with a Serial Interface Unit (SIU) for managing communication over a serial data channel, including frame synchronization, address recognition and error checking. In prior circuits, it was common to have several circuits external to the CPU chip for performing these functions. Now both central processing functions and serial communication management can be performed in a single circuit package. Although the following description will refer to certain details of this microcontroller 113, for a complete and authoritative description, reference is made to the commercial literature available from Intel Corporation, Santa Clara, Calif.

The microcontroller 113 is driven by clock and timing pulses from a crystal oscillator circuit 118 of a type suitable for the microcontroller 113 under the specifications of Intel Corporation. The microcontroller has four I/O Ports with eight terminals each. I/O Port 3 (P3) is used to connect the SIU of microcontroller 113 to the transmitter/receiver section 117 of the interface section 112.

The other I/O Ports are used for parallel data communication on the node I/O module 28 and with the host circuit board 110. I/O Port 0 (P0) provides eight lines on which address and data information is multiplexed.

The lower eight bits of address A0–A7 are transmitted from I/O Port 0 and captured in a latch 119. The microcontroller 113 transmits an address latch enable (ALE) signal to the latch when address information is present. From the latch 119, these address signals are applied to address terminals on an EPROM 120, on a RAM 121 and in the 60-pin connector 111. Some of the address signals are decoded according to wiring on the module 28 to select which of these elements 120, 121 or 111 is to be addressed.

Eight bits of data (D0–D7) are also written out or read into the microcontroller 113 from I/O Port 0, which connects through an eight-line data bus 122 to I/O data terminals on the EPROM 120 and the RAM 121. The data bus is also connected through a set of bidirectional buffers 123 to the 60-pin connector 111, so that data can be transferred to and from the host circuit board 110. And, a rack address DIP switch 124 is coupled to the data bus through a set of buffers 125. This permits the node I/O module 28 to be assigned an address which will be seen by the I/O expansion module 20 as a rack or destination address.

Returning to the I/O Ports, I/O Port 1 (P1) is used for transmission of certain control signals to the 60-pin connector 111 through suitable drivers 126. I/O Port 2 (P2) is used for transmission of the upper eight bits of address (A8–A15) information to high order address terminals on the EPROM 120 and the RAM 121. These eight bits are also transmitted via an address bus 127 and suitable drivers 128 to the 60-pin connector 111.

The EPROM (erasable and programmable read-only memory) 120 is mounted in an EPROM socket (not shown) that is adapted to hold EPROMS of various capacities. An EPROM with a capacity of 8k bytes will be typical although the size is optional and is related to the application performed by the host circuit board 110 and the communication interface to be designed for the application. A RAM (random access memory) 121 that stores 8k bytes of information is preferred for this module 28, although other sizes can be used. This RAM 121 is used in conjunction with an internal RAM in the microcontroller 113.

The EPROM 120 contains a program of instructions which can be subdivided into three basic functional blocks. One block is a group of routines for carrying out serial communication functions, and this block is generally like the programming disclosed for the adapter modules in Schultz et al., U.S. Pat. No. 4,413,319. The second block is a group of routines for communicating through the 60-pin connector. And, the third block is an operating system for providing initialization of circuitry in the node I/O module 28 and for providing transfer of control between the first block of routines and the second block.

When power is first supplied to the module 28, the microcontroller 113 will begin executing instructions in the operating system to clear its internal RAM, to clear the external RAM 121, to load the necessary initial control data in registers of the SIU and other control registers and to load initial memory pointers. It will then execute a call to an initialization routine designed for the specific application. If these initial operations are successful the CPU will return from the subroutine to the operating system routines.

The operating sequences will then set up the SIU to generate interrupts in response to communications over the serial data channel. Until an interrupt is generated, the microcontroller 113 will execute the block of application specific routines. When an interrupt occurs, data for executing the current state of the application-specific routines is saved, and the microcontroller 113 jumps to the location in the EPROM 120 where the specific interrupt routine is stored. Upon a return from the interrupt, the data that was saved is restored in various control registers.

The operating system should maintain flag bits in memory that can be tested to determine whether data to be transferred over the serial data link or through the 60-pin connector is new data or data that has previously been communicated. The operating system should also maintain flag bits in memory that can be tested to determine when all of data in a particular block has been transferred. Otherwise, data might be updated from one side of the I/O module 28 before it is seen on the other side. Within these general guidelines, various operating systems and application-specific communication routines may be programmed to interface with the serial communication routines discussed above.

The node I/O modules 28–30 are an illustration that the invention of the I/O expansion module 20 allows the expansion of I/O capacity of a single-rack programmable controller without additional equipment rack hardware. Previously, the backplane of the equipment rack was needed to address the I/O modules, and additional racks were added when I/O modules were added.

This completes a description of the methods and apparatus of the invention. Of course, those skilled in the art will understand that many of the details provided herein may be modified while still carrying out the invention, and, therefore, to apprise the public of the scope of the invention, the following claims are made.

Appendix A

COMPONENT APPENDIX

| Component | Ref. No. | Description |
|---|---|---|
| Microcomputer | 60 | 8749 8-bit microcomputer available from Intel Corp. |
| RAM | 62 | 6116 2k × 8-bit random access memory available from Seeq or Hitachi |
| Address latch | 63 | 74LS373 octal D-type latches available from Texas Instruments, Inc. |
| Address buffers | 64 | Two 74LS541 octal buffers, line drivers, available from Texas Instruments, Inc. |
| Data buffer | 65 | 74ALS245 octal bus transceivers available from Texas Instruments, Inc. |
| Latch | 66 | 74LS374 octal D-type flip-flops available from Texas Instruments, Inc. |
| Latch | 67 | 74LS273 octal D-type flip-flops available from Texas Instruments, Inc. |
| Latch | 68 | 74AS533 octal transparent latch available from Texas instruments, Inc. |
| SIO circuit | 83 | Z80-SIO serial input/output circuit available from Zilog, Inc. |
| CTC circuit | 81 | Z80-CTC counter/timer circuit available from Zilog, Inc. |
| Microprocessor | 82 | Z80-CPU available from Zilog, Inc. |
| RAM | 85 | 6116 2k × 8-bit random access memory available from Hitachi |
| EPROM | 86 | 2764 8k × 8-bit erasable programmable read-only memory availbble from Seeq or Hitachi |
| Chip select circuit | 87 | 74LS375 4-bit bistable latch; 74LS138 three-to-eight-line decoder; one 74LS367 non-inverting buffer; one of four SN 74LS00 quad two-input NAND gates; one of six 7404 hex inverters, all available from Texas Instruments, Inc. |
| Address buffers | 84 | Two 74LS541 octal buffers, line drivers, available from Texas Instruments, Inc. |
| Data buffers | 90 | 74ALS245 octal bus transceivers available from Texas Instruments, Inc. |
| Flip-flops | FF-1 FF-2 | 74LS74 dual D-type flip-flops |

Appendix A-continued
COMPONENT APPENDIX

| Component | Ref. No. | Description |
|---|---|---|
| | | available from Texas Instruments, Inc. |
| Common RAM | 53 | 6116 2k × 8-bit random access memory available from Seeq or Hitachi |
| Micro-Computer | 113 | 8344 Microcontroller manufactured by Intel Corporation |
| Latch | 119 | ALS573 octal latch/buffer manufactured by Texas Instruments, Inc. |
| EPROM | 120 | 2764 8-bit erasable programmable read-only memory available from Hitachi and other sources |
| RAM | 121 | 6116 8k × 8-bit random access memory available from Hitachi and other sources |
| Buffers | 123 | ALS645 bidirectional octal bus transceivers manufactured by Texas Instruments, Inc. |
| Drivers | 125, 126, 128 | ALS244 octal drivers manufactured by Texas Instruments, Inc. |

We claim:

1. A method by which I/O status data is coupled under the control of an I/O scanning means between a first data table in a main memory and first and second groups of I/O modules that monitor and control I/O devices according to the I/O status data, wherein the first group of I/O modules is located in a first equipment rack having a backplane, and wherein the second group of I/O modules is located outside the first equipment rack, the method comprising:

connecting an I/O expansion module in any one of a plurality of I/O module positions in the first equipment rack corresponding to image table addresses existing within the first data table prior to I/O expansion, wherein the I/O expansion module has a second data table;

coupling words of I/O data through the backplane and between the first data table and the I/O modules in the first equipment rack by decoding image table addresses within the first data table to sequentially enable each I/O module in turn to receive or transmit I/O status data according to whether the I/O module is an input module or an output module;

coupling a multiword block of expansion I/O status data through the backplane and between the first data table and a second data table in the I/O expansion module, wherein the I/O expansion module is located at a single output address corresponding to a single image table address existing in the first data table prior of expansion; and coupling words of expansion I/O status between the block of expansion I/O status data in the second data table and the I/O modules outside the equipment rack via a serial data channel.

2. The method of claim 1, wherein the coupling of words of I/O status data to the I/O modules is modified upon an enabling of the I/O expansion module to execute the coupling of the multiword block of I/O status data.

3. The method of claim 1, wherein the second group of I/O modules includes I/O modules in a second equipment rack and also includes I/O modules outside of any equipment rack.

4. An I/O expansion module for connection to a backplane in a primary equipment rack that is adapted to hold an in-rack processor and a plurality of first tier I/O modules and for communication with one or more second tier I/O modules residing outside the primary equipment rack, the I/O expansion module comprising:
backplane controller means for electronic communication with the in-rack processor through the backplane when the I/O expansion module is located in any one of a plurality of individually addressable I/O module positions corresponding to image table memory addresses existing within the in-rack processor prior to I/O expansion, the backplane controller means communicating during operation with the in-rack processor for transfer of bytes of parallel I/O status data through the rack backplane to the I/O expansion module residing at a single open of the addressable I/O module positions existing prior to I/O expansion as part of a routine in which modules in respective I/O module positions in the equipment rack are enabled for communication with the in-rack processor;
a serial I/O port for communication with one or more second tier I/O modules located outside the equipment rack;
serial channel controller means coupled to the serial I/O port, wherein the serial channel controller means includes a second image table for storing the bytes of I/O status data in locations associated with the one or more second tier I/O modules;
means for transferring I/O status data between the backplane controller means and the second image table in the serial channel controller means; and
wherein the serial channel controller means also includes means for controlling the serial communication of I/O status data between the second image table and the one or more second tier I/O modules.

5. The I/O expansion module of claim 4, wherein the means for transferring I/O status data comprises:
a common read/write memory;
arbitration circuitry coupling the backplane controller means and the serial channel controller means for alternating access to the common read/write memory; and
means in the backplane controller means and means in the serial channel controller means that are each in electronic communication with the arbitration circuitry and with the common read/write memory to transfer I/O status data between the backplane controller means and the image table in the serial channel controller means.

6. The I/O expansion module of claim 4,
wherein the image table has a plurality of locations corresponding to respective second tier I/O modules; and
wherein the means for controlling communication between the image table and the second tier I/O module couples I/O status data in serial data format for a plurality of second tier I/O modules.

7. The I/O expansion module of claim 4, wherein the means for controlling communication between the image table and the second tier I/O module couples I/O status data for a plurality of second tier I/O modules.

8. The improvement of claim 7, wherein the second tier I/O modules include I/O modules in another equipment rack and also include I/O modules outside of any equipment rack.

9. In a programmable controller of a type having a primary equipment rack for connection to a plurality of first tier I/O modules through a backplane and of a type having a processor module for connection to the backplane, wherein the processor module has a first I/O image table for storing discrete bytes of I/O status data and has a bulk storage area for storing a block to I/O status data, an improvement of an I/O expansion module for connection to the backplane and for connection to a plurality of second tier I/O modules residing outside the primary equipment rack, wherein the I/O expansion module comprises:
backplane controller means for electronic communication with the processor module through the rack backplane when the I/O expansion module is located an any one of a plurality of individually addressable I/O module positions corresponding to respective addresses existing in the first image table prior to I/O expansion, the backplane controller means communicating during operation with the processor module for transfer of the block of I/O status data through the rack backplane as part of a routine in which the discrete bytes of I/O status data are transferred for other I/O modules in the primary equipment rack;
a serial I/O port for communication with the second tier I/O modules located outside the primary equipment rack;
serial channel controller means coupled to the serial I/O port, wherein the serial channel controller means includes a second image table for storing the block of I/O status data such that a byte of I/O status data is associated with the second tier I/O module;
means for transferring the block of status data between the backplane controller means and the second image table in the serial channel controller means; and
wherein the serial channel controller means also includes means for handling the I/O status data associated with the second tier I/O modules as serial data incorporated in messages that are coupled between the second image table and the second tier I/O modules to multiplex and d(e)multiplex the I/O status data; and
wherein the I/O expansion module is located at a single one of the individually addressable I/O positions corresponding to a single respective first image table address existing prior to I/O expansion.

10. The improvement of claim 9, wherein the second tier I/O modules include I/O modules in another equipment rack and also includes I/O modules outside of any equipment rack.

* * * * *

UNITED STATES PATENT AND TRADEMARK OFFICE
CERTIFICATE OF CORRECTION

PATENT NO. : 4,882,702

DATED : November 21, 1989

INVENTOR(S) : Struger, et al.

It is certified that error appears in the above—identified patent and that said Letters Patent is hereby corrected as shown below:

| | |
|---|---|
| Col. 12, line 26 | The --E.-- is missing before the name of the paragraph. |
| Col. 21, line 53 | "availbble" should be --available--. |
| Col. 22, line 45 | After "I/O" insert --status--. |
| Col. 22, line 59 | Change "of" to --to--. |
| Col. 22, line 60 | After "status" insert --data--. |
| Col. 23, line 22 | Change "open" to --one--. |
| Col. 23, line 56 | Change "," to --:--. |
| Col. 24, line 15 | Change "block to" to --block of--. |
| Col. 24, line 24 | Change "located an" to --located in--. |

UNITED STATES PATENT AND TRADEMARK OFFICE
CERTIFICATE OF CORRECTION

PATENT NO. : 4,882,702
DATED : November 21, 1989
INVENTOR(S) : Struger, et al.

It is certified that error appears in the above—identified patent and that said Letters Patent is hereby corrected as shown below:

Col. 24, line 43   After "block of" insert --I/O--.

Col. 24, line 52   Change "demultiplex" to --demultiplex--.

Col. 24, line 61   Change "includes" to --include--.

Signed and Sealed this

Fifth Day of March, 1991

*Attest:*

HARRY F. MANBECK, JR.

*Attesting Officer*  *Commissioner of Patents and Trademarks*